US012220919B2

(12) United States Patent
Aimono

(10) Patent No.: US 12,220,919 B2
(45) Date of Patent: Feb. 11, 2025

(54) LIQUID EJECTING HEAD AND LIQUID EJECTING APPARATUS

(71) Applicant: SEIKO EPSON CORPORATION, Tokyo (JP)

(72) Inventor: Takanori Aimono, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 18/163,040

(22) Filed: Feb. 1, 2023

(65) Prior Publication Data

US 2023/0249463 A1 Aug. 10, 2023

(30) Foreign Application Priority Data

Feb. 4, 2022 (JP) ................................ 2022-016087
Feb. 4, 2022 (JP) ................................ 2022-016088
Mar. 3, 2022 (JP) ................................ 2022-032533

(51) Int. Cl.
*B41J 2/045* (2006.01)
*B41J 2/14* (2006.01)

(52) U.S. Cl.
CPC .................................. *B41J 2/1433* (2013.01)

(58) Field of Classification Search
CPC ... B41J 2/1433; B41J 2/14201; B41J 2/04581
See application file for complete search history.

(56) References Cited

U.S. PATENT DOCUMENTS

2009/0225113 A1* 9/2009 Yazaki ................. B41J 2/04593 347/72
2015/0273828 A1* 10/2015 Hibino ..................... B41J 2/164 347/71
2018/0281405 A1* 10/2018 Suzuki ................. B41J 2/14201
2019/0283421 A1* 9/2019 Miyazawa ........... B41J 2/14233

FOREIGN PATENT DOCUMENTS

JP 2019-155768 A 9/2019

* cited by examiner

*Primary Examiner* — Jason S Uhlenhake
(74) *Attorney, Agent, or Firm* — WORKMAN NYDEGGER

(57) ABSTRACT

A liquid ejecting head includes: a nozzle plate including a first-nozzle; first and second pressure chambers arranged side by side in a first-direction; third and fourth pressure chambers arranged side by side in the first-direction; a first-communication-flow-path extending along the nozzle plate, coupled to the first-nozzle, and communicating with the first to fourth pressure chambers; a first-common-liquid-chamber communicating with the first and second pressure chambers; and a second-common-liquid-chamber communicating with the third and fourth pressure chambers. The first and second pressure chambers and the third and fourth pressure chambers are shifted in a second-direction orthogonal to the first-direction. When a width of the first communication flow path in the first-direction at a position overlapping the first-nozzle is defined as a first-width, and a width of the first-pressure-chamber in the first-direction is defined as a pressure chamber width, the first-width is equal to or greater than the pressure chamber width.

20 Claims, 15 Drawing Sheets

LIQUID EJECTING HEAD AND LIQUID EJECTING APPARATUS

The present application is based on, and claims priority from JP Application Serial Number 2022-016088, filed Feb. 4, 2022, JP Application Serial Number 2022-016087, filed Feb. 4, 2022, and JP Application Serial Number 2022-032533, filed Mar. 3, 2022, the disclosures of which are hereby incorporated by reference herein in their entirety.

BACKGROUND

1. Technical Field

The present disclosure relates to a liquid ejecting head and a liquid ejecting apparatus.

2. Related Art

JP-A-2019-155768 discloses a liquid ejecting head in which four pressure chambers are provided on both sides of a nozzle, and flow paths from each of the four pressure chambers to the nozzle are joined near the nozzle.

However, in the above technology of the related art, since the width of the flow path from the four pressure chambers to the nozzle is narrow, there is a problem that the flow path resistance is large and the ejection efficiency is not good.

SUMMARY

According to a first aspect of the present disclosure, there is provided a liquid ejecting head including: a nozzle plate on which a first nozzle for ejecting a liquid is formed; first and second pressure chambers arranged side by side in a first direction; third and fourth pressure chambers arranged side by side in the first direction; a first communication flow path extending along the nozzle plate, coupled to the first nozzle, and communicating with the first to fourth pressure chambers; a first common liquid chamber communicating with the first and second pressure chambers; and a second common liquid chamber communicating with the third and fourth pressure chambers. The first and second pressure chambers and the third and fourth pressure chambers are shifted in a second direction orthogonal to the first direction. When a width of the first communication flow path in the first direction at a position overlapping the first nozzle in plan view seen toward the nozzle plate is defined as a first width, and a width of the first pressure chamber in the first direction is defined as a pressure chamber width, the first width is equal to or greater than the pressure chamber width.

According to a second aspect of the present disclosure, there is provided a liquid ejecting head including: a nozzle plate on which nozzles for ejecting a liquid are formed; N pressure chambers A arranged side by side in a first direction when N is an integer of 3 or more; N pressure chambers B shifted from the N pressure chambers A in a second direction orthogonal to the first direction, and arranged side by side in the first direction; a communication flow path extending along the nozzle plate, coupled to the nozzle, and communicating with the N pressure chambers A and the N pressure chambers B; a first common liquid chamber communicating with the N pressure chambers A; and a second common liquid chamber communicating with the N pressure chambers B. When a width of the communication flow path in the first direction at a position overlapping the nozzle in plan view seen toward the nozzle plate is defined as a first width, and a width of the pressure chamber A in the first direction is defined as a pressure chamber width, the first width is equal to or greater than the pressure chamber width.

According to a third aspect of the present disclosure, there is provided a liquid ejecting apparatus including: the liquid ejecting head; and a liquid storage section for storing a liquid supplied to the liquid ejecting head.

DESCRIPTION OF EXEMPLARY EMBODIMENTS

A. First Embodiment

Figure 1:
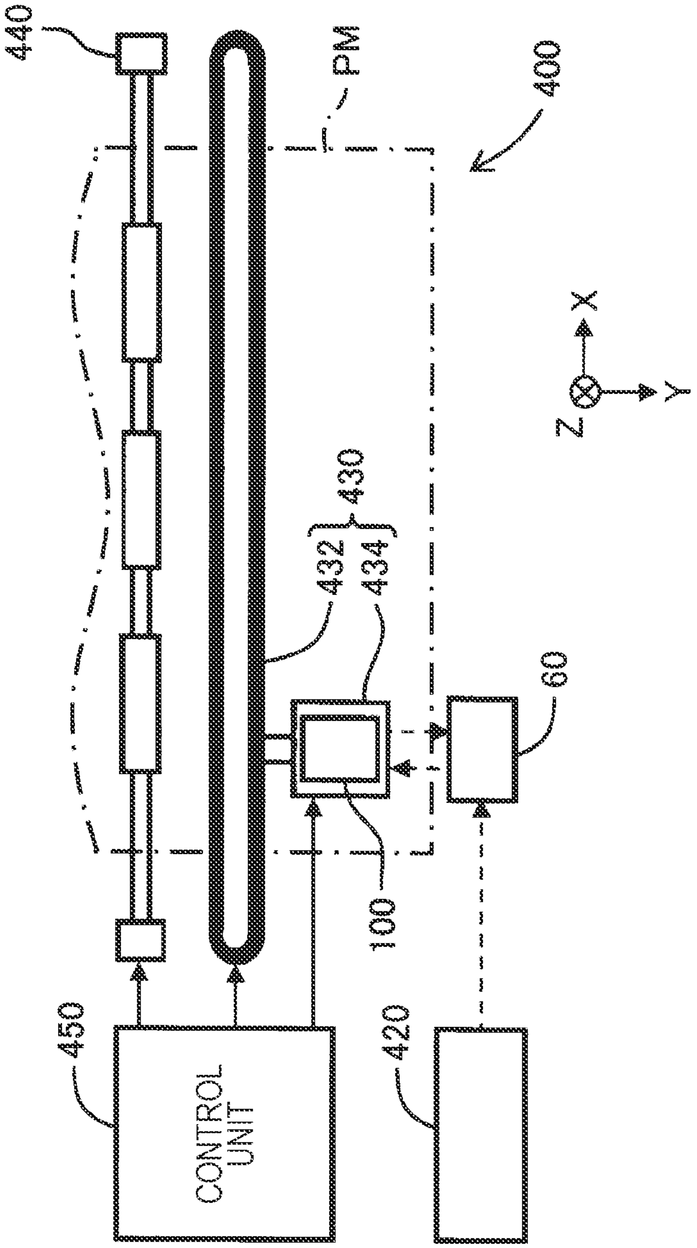
FIG. 1 is an explanatory view illustrating a configuration of a liquid ejecting apparatus according to an embodiment.

FIG. 1 is an explanatory view illustrating a configuration of a liquid ejecting apparatus 400 according to an embodiment. The liquid ejecting apparatus 400 is an ink jet type printing apparatus that ejects ink, which is an example of a liquid, onto a medium PM. The composition of the ink is not particularly limited. For example, the ink may be a water-based ink in which a coloring material such as a dye or pigment is dissolved in a water-based solvent, a solvent-based ink in which a coloring material is dissolved in an organic solvent, or an ultraviolet curable type ink. In addition, the liquid ejecting apparatus 400 may eject paint as a liquid instead of ink. A liquid storage section 420 for storing ink can be attached to the liquid ejecting apparatus 400. The liquid ejecting apparatus 400 executes printing by ejecting the ink in the liquid storage section 420 toward the medium PM. The liquid ejecting apparatus 400 includes a liquid ejecting head 100, a moving mechanism 430, a transport mechanism 440, a control unit 450, and a circulation mechanism 60.

Figure 2:
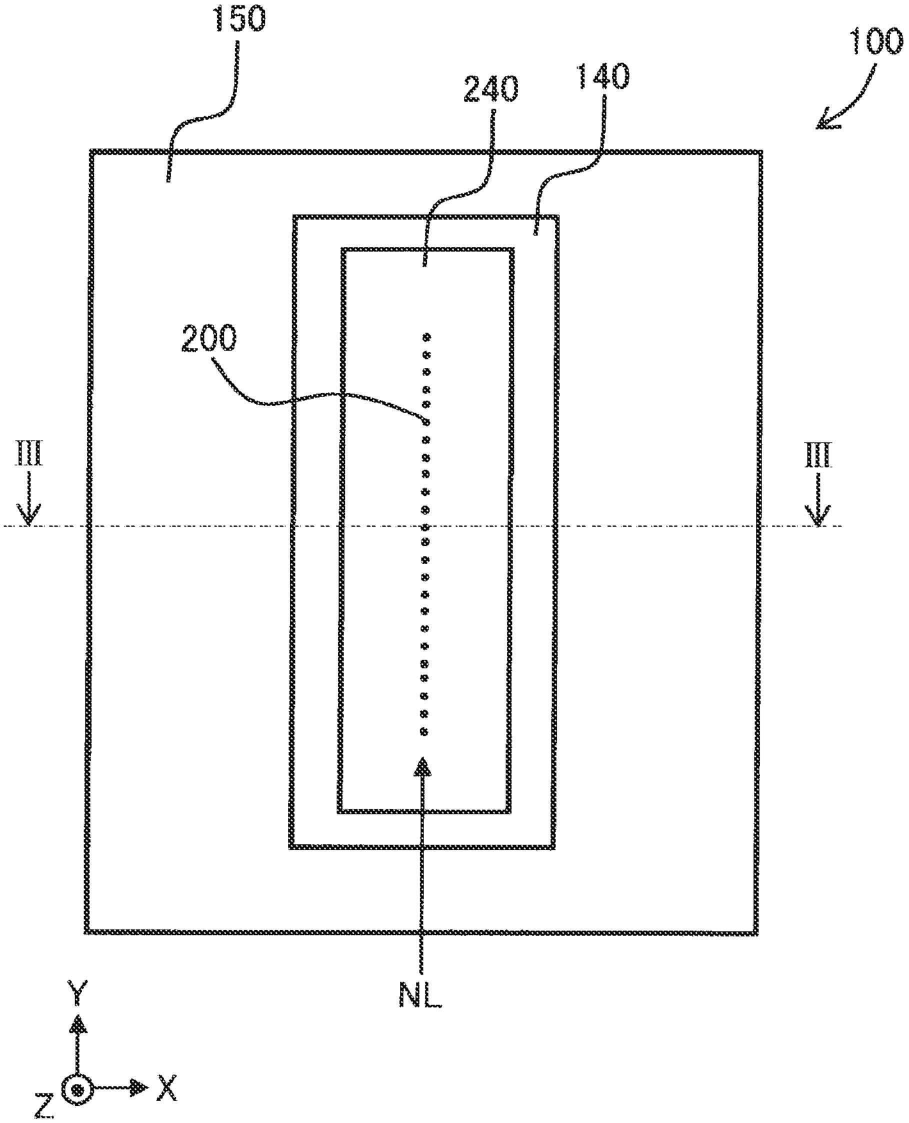
FIG. 2 is a bottom view of a liquid ejecting head.

The liquid ejecting head 100 includes a plurality of nozzles 200 as illustrated in FIG. 2, and ejects liquid ink supplied from the liquid storage section 420 from the plurality of nozzles 200. Specific examples of the liquid storage section 420 include a container such as a cartridge that is attachable to and detachable from the liquid ejecting apparatus 400, a bag-shaped ink pack formed of a flexible film, and an ink tank that can be refilled with ink. Ink ejected from the nozzle 200 lands on the medium PM. The medium PM is typically a printing paper sheet. The medium PM is not limited to a printing paper sheet, and may be, for example, a printing target of any material such as a resin film or cloth.

The moving mechanism 430 includes a ring-shaped belt 432 and a carriage 434 fixed to the belt 432. The carriage 434 holds the liquid ejecting head 100. The moving mechanism 430 can reciprocate the liquid ejecting head 100 along the X direction by rotating the ring-shaped belt 432 in both directions.

The transport mechanism 440 transports the medium PM along the Y direction between movements of the liquid ejecting head 100 by the moving mechanism 430. The Y direction is a direction orthogonal to the X direction. In this embodiment, the X direction and the Y direction are horizontal directions. The Z direction is a direction intersecting the X direction and the Y direction. In this embodiment, the Z direction is vertically downward. The liquid ejecting head 100 ejects ink along the Z direction while being transported along the X direction. The Z direction is also referred to as "ejection direction Z". In the following description, the tip end side of the arrow indicating the X direction in the drawing is referred to as the +X side, and the base end side is referred to as the −X side. The tip end side of the arrow indicating the Y direction in the drawing is referred to as the +Y side, and the base end side is referred to as the −Y side. The tip end side of the arrow indicating the Z direction in the drawing is referred to as the +Z side, and the base end side is referred to as the −Z side.

The control unit 450 controls the operation of ejecting ink from the liquid ejecting head 100. The control unit 450 controls the transport mechanism 440, the moving mechanism 430, and the liquid ejecting head 100 to form an image on the medium PM.

FIG. 2 is a bottom view of the liquid ejecting head 100. The liquid ejecting head 100 includes the plurality of nozzles 200. The plurality of nozzles 200 are formed to penetrate a nozzle plate 240 disposed parallel to the XY plane. The plurality of nozzles 200 constitute a nozzle array NL by being linearly arranged along the Y direction. The nozzle plate 240 is manufactured, for example, by processing a silicon single crystal substrate using semiconductor processing technology. As the silicon single crystal substrate, for example, a silicon single crystal substrate having a (100) surface as a main surface is preferably used. Note that the nozzle plate 240 may be made of a material such as stainless steel (SUS) or titanium.

Figure 3:
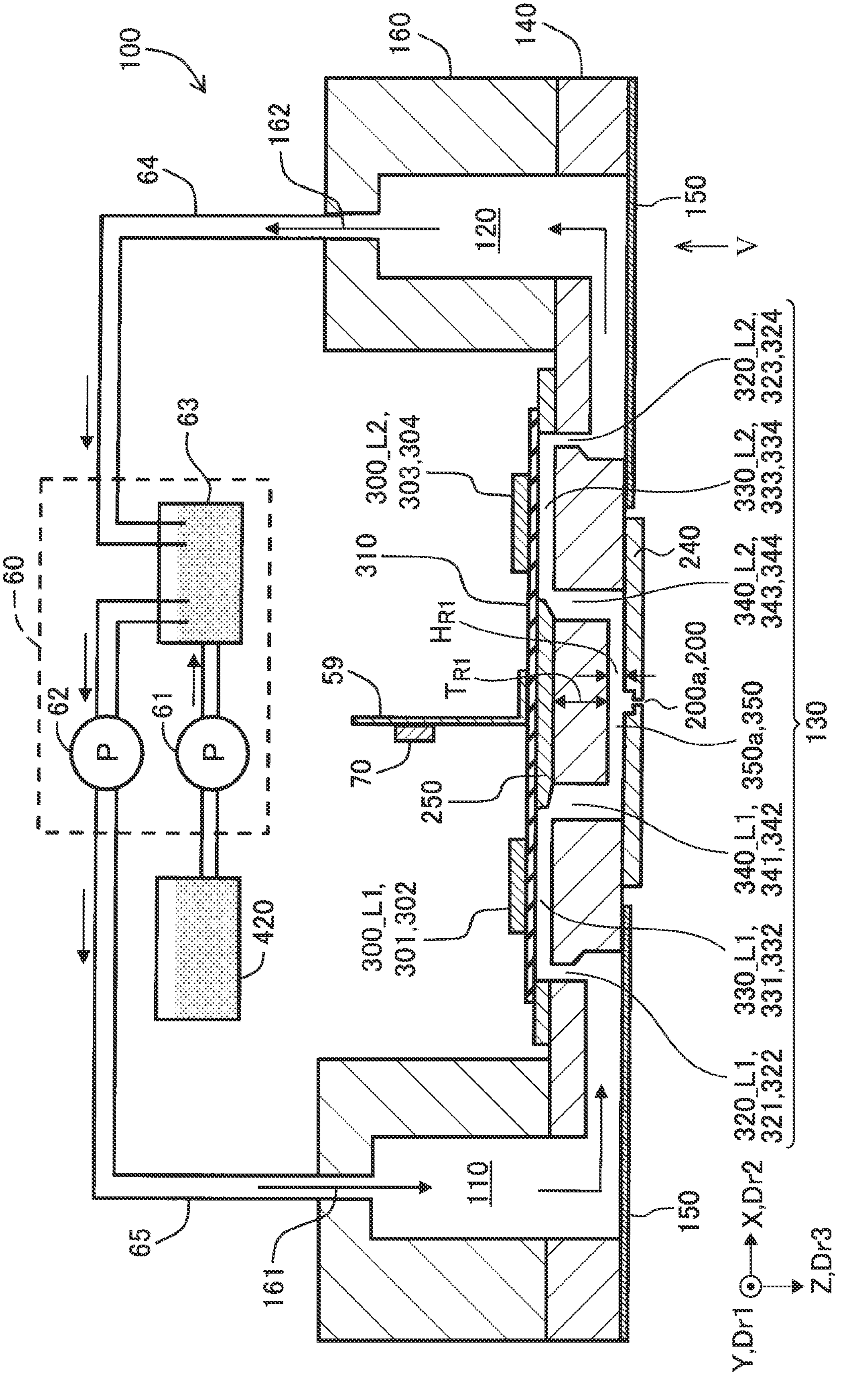
FIG. 3 is a cross-sectional view illustrating a cross section taken along the line III-III of FIG. 2.
Figure 4:
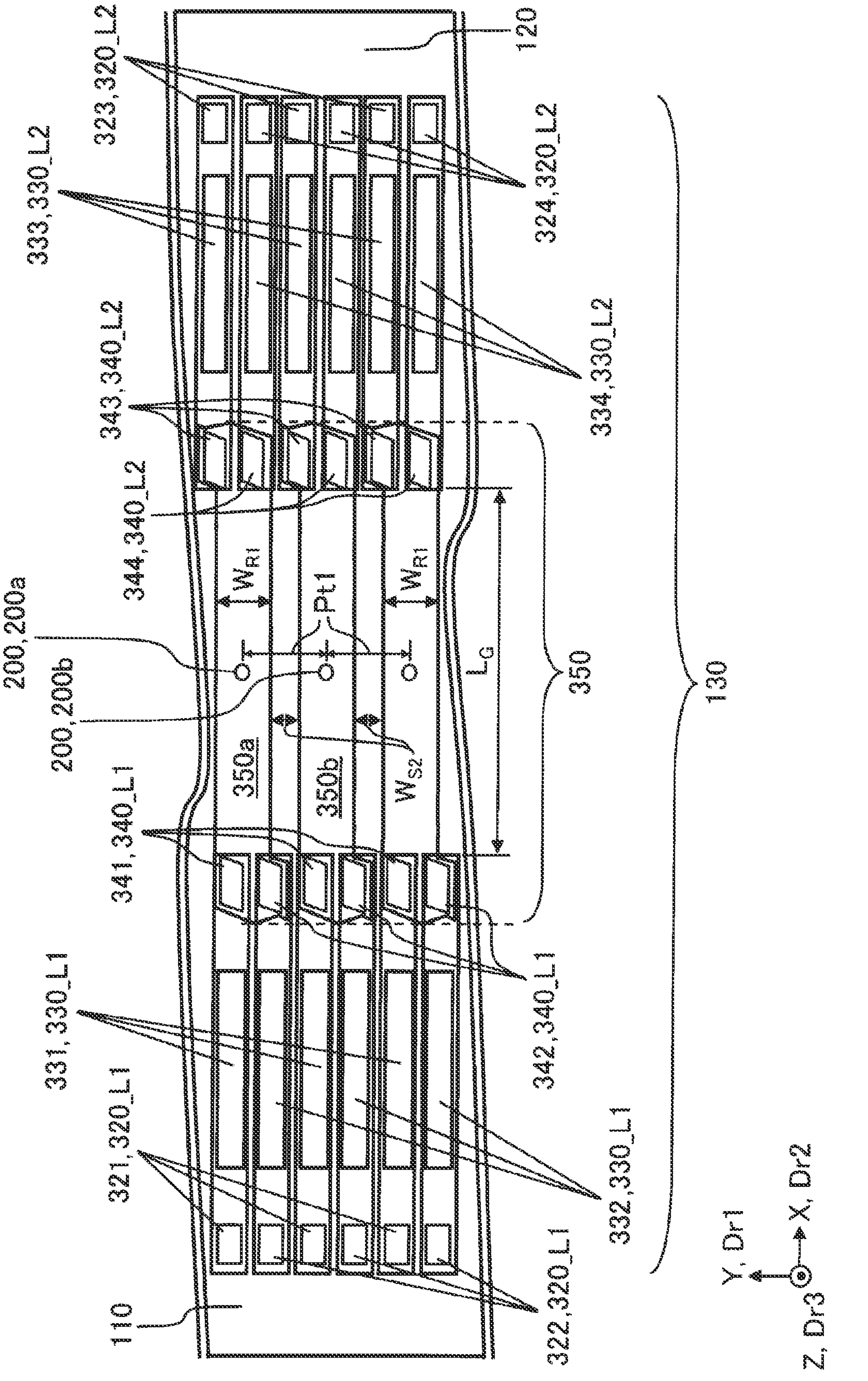
FIG. 4 is a view illustrating a part of flow paths for three nozzles and first and second common liquid chambers, viewed from the bottom of FIG. 3.
Figure 5:
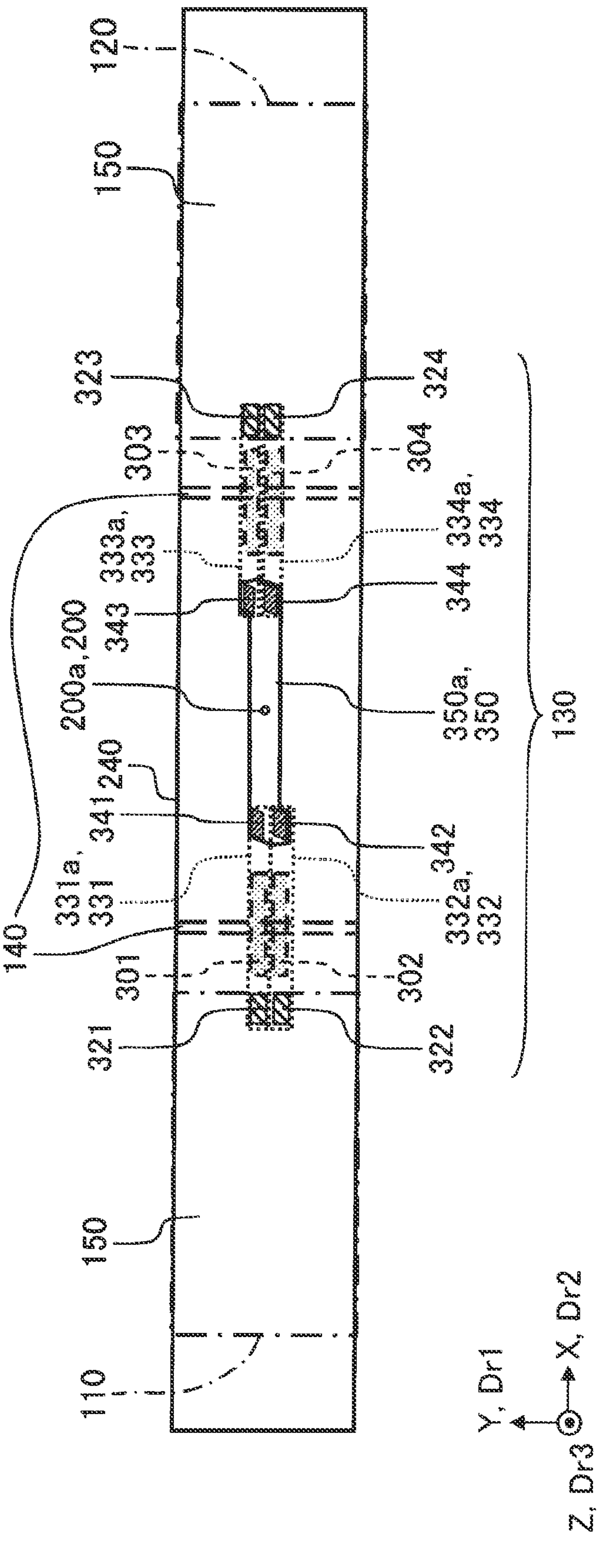
FIG. 5 is a view illustrating a part of a flow path for one nozzle viewed from the bottom of FIG. 3.
Figure 6:
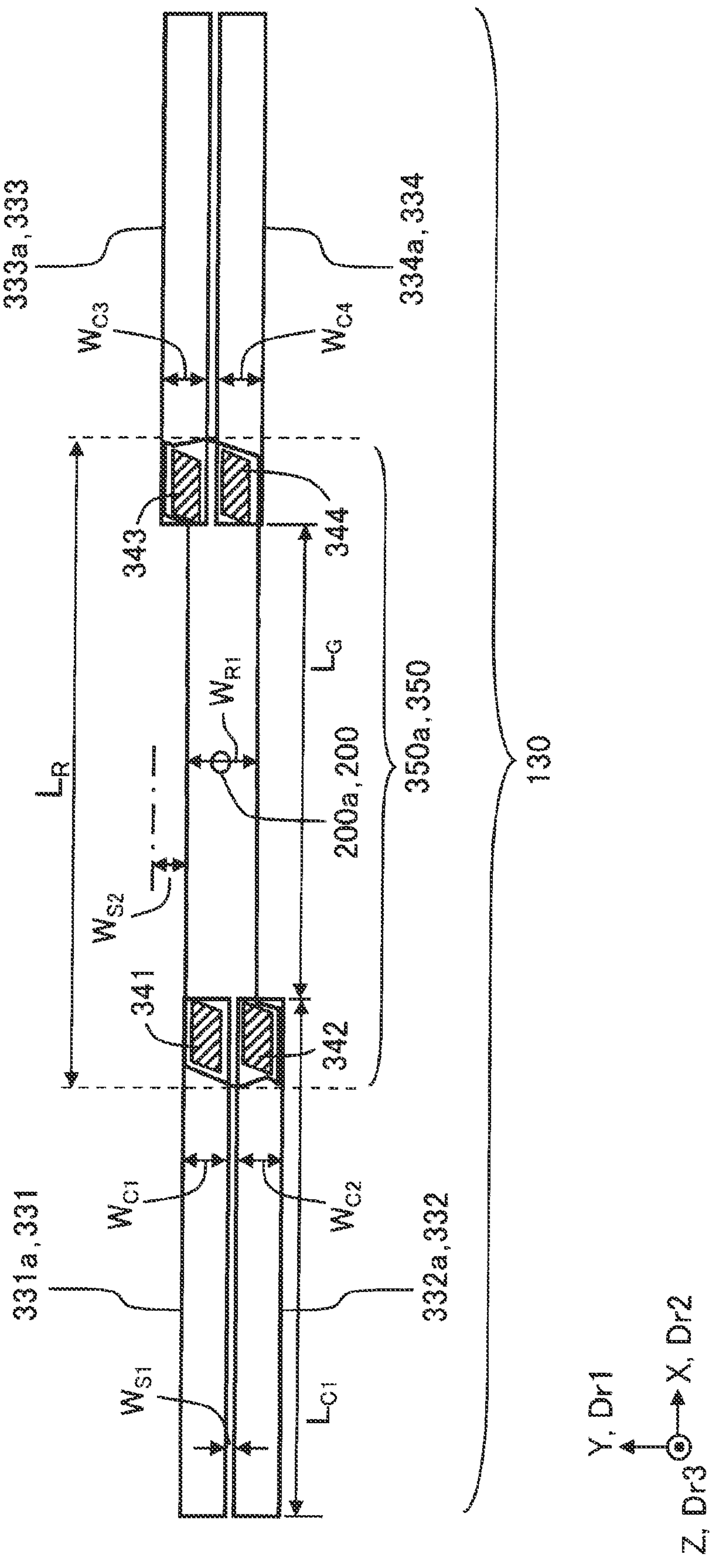
FIG. 6 is an enlarged view of the flow path of FIG. 5.

FIG. 3 is a cross-sectional view taken along the line III-III of FIG. 2. FIG. 4 is a view illustrating a part of flow paths for three nozzles, a first common liquid chamber 110, and a second common liquid chamber 120, viewed from the bottom of FIG. 3. FIG. 5 is a view illustrating a part of a flow path for one nozzle and the common liquid chambers 110 and 120, viewed from the bottom of FIG. 3. FIG. 6 is an enlarged view of the flow path of FIG. 5. Note that FIG. 4 illustrates only the three nozzle-specific flow paths 130, the first common liquid chamber 110, and the second common liquid chamber 120. In addition, in FIG. 5, for convenience of illustration, the communication flow path 350 is drawn with solid lines, the pressure chamber 330 is drawn with dotted lines, the driving element 300 is drawn with dashed lines, and the common liquid chambers 110 and 120 are drawn with dot dash lines. In FIG. 6, illustration of the coupling flow paths 321 to 324 and the driving elements 301 to 304 is omitted. In addition, FIG. 4 illustrates three nozzles 200, including nozzles 200*a* and 200*b*. When the nozzle 200*a*, which is any one of the plurality of nozzles 200, is the "first nozzle", the nozzle 200*b* is an example of the "second nozzle". The nozzle 200 illustrated in each of FIGS. 3, 5, and 6 is nozzle 200*a*.

In each drawing after FIG. 3, a first direction Dr1, a second direction Dr2, and a third direction Dr3 are also illustrated. The first direction Dr1 is the direction in which pressure chambers 331 and 332 are arranged and the direction in which pressure chambers 333 and 334 are arranged. The second direction Dr2 is a direction orthogonal to the first direction Dr1. The first direction Dr1 and the second direction Dr2 are directions parallel to the front surface of the nozzle plate 240. The third direction Dr3 is the thickness direction of the nozzle plate 240. The thickness direction of the nozzle plate 240 means the direction along the shortest side among the three sides of the nozzle plate 240. In this embodiment, the first direction Dr1 is parallel to the Y direction, the second direction Dr2 is parallel to the X direction, and the third direction Dr3 is parallel to the Z direction. However, the three directions Dr1 to Dr3 may be set to directions different from this example.

As illustrated in FIG. 4, an interval Pt1 between adjacent nozzles 200, that is, the distance between the centers of the nozzles 200 in the Y direction is constant. Further, an interval Pt2 between adjacent pressure chambers 330_L1 among the plurality of pressure chambers 330_L1 constituting a row L1, that is, the distance between the centers of the pressure chambers 330_L1 in the Y direction is constant. A row L2 has a similar relationship. Furthermore, the interval Pt2 in the row L1 and the interval Pt2 in the row L2 are the same, with the interval Pt2 being half the interval Pt1. In addition, the interval Pt2 between the pressure chambers 330 is the same as the interval between the communication holes 340, and is also the same as the interval between the centers of the nozzles 200 in the Y direction.

As illustrated in FIG. 3, the liquid ejecting head 100 includes a first common liquid chamber 110 to which ink is supplied, a second common liquid chamber 120 to which ink is discharged, and a nozzle-specific flow path 130 that couples the first common liquid chamber 110 and the second common liquid chamber 120. The first common liquid chamber 110 and the second common liquid chamber 120 are provided commonly to the plurality of nozzles 200, and the nozzle-specific flow paths 130 are provided individually for the individual nozzles 200. Each of the common liquid chambers 110 and 120 extends in the Y direction, which is the direction along the nozzle array NL. That is, the longitudinal direction of the common liquid chambers 110 and 120 is parallel to the direction in which the plurality of nozzles 200 are arranged.

The liquid ejecting head 100 has a row L1 of the plurality of pressure chambers 330 communicating with the first common liquid chamber 110, and a row L2 of the plurality of pressure chambers 330 communicating with the second common liquid chamber 120. The row L1 is formed by arranging the plurality of pressure chambers 330 in the Y direction, and the row L2 is formed by arranging the plurality of pressure chambers 330 in the Y direction. The row L1 is arranged on the −X side with respect to the nozzle array NL, and the row L2 is arranged on the +X side with respect to the nozzle array NL. Hereinafter, the plurality of pressure chambers 330 forming the row L1 will be referred to as pressure chambers 330_L1, and the plurality of pressure chambers 330 forming the row L2 will be referred to as pressure chambers 330_L2. Regarding the driving elements 300, the coupling flow paths 320, and the communication holes 340, which will be described later in detail, the driving element 300 corresponding to the row L1 is referred to as a driving element 300_L1, the driving element 300 corresponding to the row L2 is referred to as a driving element 300_L2, a coupling flow path 320 corresponding to the row L1 is referred to as a coupling flow path 320_L1, a coupling flow path 320 corresponding to the row L2 is referred to as a coupling flow path 320_L2, a communication hole 340 corresponding to the row L1 is referred to as a communication hole 340_L1, and a communication hole 340 corresponding to the row L2 is referred to as a communication hole 340_L2.

The nozzle-specific flow paths 130 corresponding to one nozzle 200 in this embodiment include two pressure chambers 330_L1 in the row L1, two pressure chambers 330_L2 in the row L2, two coupling flow paths 320_L1 corresponding to each of the two pressure chambers 330_L1, two coupling flow paths 320_L2 corresponding to each of the two pressure chambers 330_L2, two communication holes 340_L1 corresponding to each of the two pressure chambers 330_L1, two communication holes 340_L2 corresponding to each of the two pressure chambers 330_L2, and the communication flow path 350. Here, the two pressure chambers 330_L1 in the row L1 are referred to as pressure chambers 331 and 332, the two pressure chambers 330_L2 in the row L2 are referred to as pressure chambers 333 and 334, these two coupling flow paths 320_L1 are referred to as coupling flow paths 321 and 322, these two coupling flow paths 320_L2 are referred to as coupling flow paths 323 and 324, these two communication holes 340_L1 are referred to as communication holes 341 and 342, and these two communication holes 340_L2 are referred to as communication holes 343 and 344. In addition, the four driving elements 300 corresponding to each of the pressure chambers 331 to 334 are referred to as driving elements 301 to 304.

Each of the common liquid chambers 110 and 120 can be considered to extend in the Y direction or in the direction in which the adjacent pressure chambers 331 and 332 are arranged, that is, the direction in which the row L1 of the pressure chambers 330 extends in the extending direction. In this embodiment, the direction in which the adjacent pressure chambers 331 and 332 are arranged is an example of the "first direction". In addition, the plurality of nozzle-specific flow paths 130 are arranged in the Y direction along the nozzle array NL.

The lower portions of the common liquid chambers 110 and 120 and the plurality of nozzle-specific flow paths 130 are mainly formed by a communication plate 140. The communication plate 140 may be configured by laminating a plurality of plate-shaped members. A housing section 160 and a pressure chamber substrate 250 are installed on the upper surface of the communication plate 140, that is, the surface of the communication plate 140 facing the −Z side. The pressure chamber substrate 250 is positioned inside the housing section 160 in plan view in the Z direction. A vibrating plate 310 is positioned on the upper surface of the pressure chamber substrate 250, that is, the surface of the pressure chamber substrate 250 facing the −Z side. The plurality of pressure chambers 330 are provided in the pressure chamber substrate 250. Each pressure chamber 330 is a space defined by the communication plate 140, the vibrating plate 310, and the pressure chamber substrate 250. The pressure chamber substrate 250 is manufactured, for example, by processing a silicon single crystal substrate using semiconductor processing technology. As the silicon single crystal substrate, for example, a (110) substrate, that is, a silicon single crystal substrate having a (110) surface as a main surface is preferably used.

The vibrating plate 310 is a plate-shaped member that can elastically vibrate. The vibrating plate 310 is, for example, a laminated body including a first layer made of silicon oxide ($SiO_2$) and a second layer made of zirconium oxide ($ZrO_2$). Further, another layer such as a metal oxide may be interposed between the first layer and the second layer. Further, a part or all of the vibrating plate 310 may be integrally made of the same material as the pressure chamber substrate 250. For example, the vibrating plate 310 and the pressure chamber substrate 250 can be integrally formed by selectively removing a part of the thickness direction of the region corresponding to the pressure chamber 330 in a plate-shaped member having a predetermined thickness by etching or the like. Further, the vibrating plate 310 may be composed of a layer of a single material.

A nozzle plate 240 is installed on the lower surface of the communication plate 140, that is, the surface facing the +Z side of the communication plate 140, and the lower end portions of the first common liquid chamber 110 and the second common liquid chamber 120, that is, the end portions on the +Z side of the first common liquid chamber 110 and the second common liquid chamber 120 are sealed with a flexible sealing film 150 made of a resin film, a thin metal film, or the like.

A wiring substrate 59 is bonded to the surface of the vibrating plate 310 facing the −Z side. The wiring substrate 59 is a mounting component formed with a plurality of wirings for electrically coupling the control unit 450 and the liquid ejecting head 100. The wiring substrate 59 is, for example, a flexible wiring substrate such as a flexible printed circuit (FPC) or a flexible flat cable (FFC). A drive circuit 70 for driving the driving element 300 is mounted on the wiring substrate 59. The drive circuit 70 supplies a driving signal to each driving element 300.

A plurality of driving elements 300 are provided corresponding to each of the pressure chambers 330 on the upper surface of the vibrating plate 310, that is, the surface of the vibrating plate 310 facing the −Z side. These driving elements 300 are composed of piezoelectric elements, for example. The piezoelectric element is composed of, for example, a piezoelectric layer and two electrodes provided to sandwich the piezoelectric layer. For example, when the driving elements 301 to 304, which are piezoelectric elements, vibrate, the vibrations are transmitted to the pressure chambers 331 to 334, respectively, and pressure waves are generated in the pressure chambers 331 to 334, respectively. Ink is ejected from nozzles 200 by the pressure generated by the driving elements 301 to 304. As the driving element, a heating element that heats the ink in the pressure chamber 330 may be used instead of the piezoelectric element.

The circulation mechanism 60 is coupled to the common liquid chambers 110 and 120. The circulation mechanism 60 supplies ink to the first common liquid chamber 110 and collects ink discharged from the second common liquid chamber 120 for resupply to the first common liquid chamber 110. The circulation mechanism 60 includes a first supply pump 61, a second supply pump 62, a storage container 63, a collection flow path 64, and a supply flow path 65.

The first supply pump 61 is a pump that supplies the ink stored in the liquid storage section 420 to the storage container 63. The storage container 63 is a sub tank that temporarily stores the ink supplied from the liquid storage section 420. The collection flow path 64 is interposed between the second common liquid chamber 120 and the storage container 63 and is a flow path for collecting the ink from the second common liquid chamber 120 to the storage container 63. The ink stored in the liquid storage section 420 is supplied from the first supply pump 61 to the storage container 63. Further, the ink, which is supplied from the first common liquid chamber 110 to each nozzle-specific flow path 130, but is discharged from each nozzle-specific flow path 130 to the second common liquid chamber 120 without being ejected from the nozzle 200, is supplied to the storage container 63 through the collection flow path 64. The second supply pump 62 is a pump that sends the ink stored in the storage container 63. The supply flow path 65 is interposed between the first common liquid chamber 110 and the storage container 63 and is a flow path for supplying the ink in the storage container 63 to the first common liquid chamber 110.

An opening portion 161 at the upper end of the first common liquid chamber 110, that is, the end portion on the −Z side of the first common liquid chamber 110 is coupled to the supply flow path 65 outside the liquid ejecting head 100. In other words, the opening portion 161 of this embodiment functions as an inlet for introducing the liquid from the circulation mechanism 60. An opening portion 162 at the upper end of the second common liquid chamber 120, that is, the end portion on the −Z side of the second common liquid chamber 120 is coupled to the collection flow path 64 of the circulation mechanism 60 outside the liquid ejecting head 100. In other words, the opening portion 162 of this embodiment functions as an outlet for discharging the liquid to the circulation mechanism 60.

The nozzle-specific flow path 130 has the following flow paths and spaces. In the following description, the term "coupling" is used in the sense of direct coupling. In addition, the term "communication" is used in a broad sense including not only direct coupling but also indirect coupling.

Coupling Flow Paths 321 to 324

The coupling flow path 321 couples the first common liquid chamber 110 and the pressure chamber 331.

The coupling flow path 322 couples the first common liquid chamber 110 and the pressure chamber 332.

The coupling flow path 323 couples the second common liquid chamber 120 and the pressure chamber 333.

The coupling flow path 324 couples the second common liquid chamber 120 and the pressure chamber 334.

All of the coupling flow paths 321 to 324 are flow paths extending in the Z direction and penetrate the communication plate 140. In FIGS. 5 and 6, the coupling flow paths 321 to 324 are hatched for convenience of illustration. A part where the coupling flow path 320 and the pressure chamber 330 intersect can be regarded as a part of the pressure chamber 330.

Pressure Chambers 331 to 334

The pressure chamber 331 to the pressure chambers 334 are spaces that receive pressure changes by the driving element 301 to the driving elements 304, respectively. The pressure chamber 331 and the pressure chamber 332 are arranged side by side in the first direction Dr1, and the pressure chamber 333 and the pressure chamber 334 are also arranged side by side in the first direction Dr1. In this embodiment, the first direction Dr1 is parallel to the Y direction. The pressure chamber 331 and the pressure chamber 332, and the pressure chamber 333 and the pressure chamber 334 are arranged to be shifted in the second direction Dr2 orthogonal to the first direction Dr1. In this embodiment, the second direction Dr2 is parallel to the X direction. The pressure waves generated in the pressure chamber 331 to the pressure chamber 334 reach the nozzle 200 and eject ink from the nozzle 200. The pressure chambers 331 to 334 preferably have the same shape. In this embodiment, a plurality of pressure chambers 331 to 334 are arranged in a zigzag pattern. Each pressure chamber 330 extends in the second direction Dr2. Here, a pressure chamber 331*a* communicating with the nozzle 200*a* is an example of the "first pressure chamber", a pressure chamber 332*a* communicating with the nozzle 200*a* is an example of the "second pressure chamber", a pressure chamber 333*a* communicating with the nozzle 200*a* is an example of the "third pressure chamber", and a pressure chamber 334*a* communicating with the nozzle 200*a* is an example of the "fourth pressure chamber".

Communication Holes 341 to 344

The communication hole 341 to the communication hole 344 are flow paths respectively extending in the Z direction and coupling the communication flow path 350 and each of the pressure chamber 331 to the pressure chamber 334. That is, each of the pressure chambers 330 has one end coupled to the coupling flow path 320 and the other end coupled to the communication hole 340. In addition, in FIGS. 5 and 6, the communication holes 341 to 344 are hatched for convenience of illustration. In addition, in FIG. 6, illustration of the coupling flow paths 321 to 324 and the driving elements 301 to 304 is omitted. The communication hole 341 and the communication hole 342 are arranged side by side in the first direction Dr1, and the communication hole 343 and the communication hole 344 are also arranged side by side in the first direction Dr1. The communication holes 341 to 344 are flow paths extending in the same direction as the coupling flow paths 321 to 324 and penetrate the communication plate 140. The communication holes 341 to 344 preferably have the same shape. A part where the communication hole 340 and the pressure chamber 330 intersect can be regarded as a part of the pressure chamber 330.

Communication Flow Path 350

As illustrated in FIG. 3, the communication flow path 350 is a flow path that is coupled to the nozzle 200 and communicates between the nozzle 200 and the pressure chamber 331 to the pressure chamber 334. In addition, the communication flow path 350 is a flow path extending along the nozzle surface of the nozzle plate 240 on which the plurality of nozzles 200 are formed, and the nozzles 200 are provided in the middle of the communication flow path 350. Specifically, the communication flow path 350 extends along the X direction and is defined by the communication plate 140 and the surface of the nozzle plate 240 facing the −Z side. In other words, the communication flow path 350 is a flow path of which the longitudinal direction is the second direction Dr2. A part where the communication holes 341 to 344 and the communication flow path 350 intersect can be regarded as a part of the communication flow path 350. Here, the communication flow path 350*a* coupled to the nozzle 200*a* is an example of the "first communication flow path".

As the ink, for example, a liquid having pseudoplasticity can be used. More specifically, it is preferable that the ink have a viscosity of 0.01 Pa·s or more and 0.2 Pa·s or less at a shear rate of 1000 $s^{-1}$ at 25° C., and a viscosity of 0.5 Pa·s or more and 50 Pa·s or less at a shear rate of 0.01 $s^{-1}$. In this embodiment, the four pressure chambers 331 to 334 are used to reduce the cross-sectional area of each flow path, increase the flow velocity, and reduce the viscosity of the ink, thereby making it possible to use liquid ink having pseudoplasticity. However, from the pressure chambers 331 to 334 to the nozzle 200, it is desirable to efficiently use the energy of the driving elements 301 to 304, and thus it is not preferable to excessively increase the flow path resistance. Therefore, in this embodiment, a width $W_{R1}$ of the communication flow path 350 illustrated in FIG. 6 is increased to reduce the flow path resistance.

In this embodiment, four pressure chambers 331 to 334 are provided for one nozzle 200, but five or more pressure chambers may be provided. In either case, driving elements are provided to correspond to individual pressure chambers.

The nozzle-specific flow path 130 of this embodiment can be considered to include four individual flow paths corresponding to the four driving elements 301 to 304, and a flow path common to the four driving elements 301 to 304. An "individual flow path" is a flow path including at least the pressure chamber 330, and one individual flow path corresponds to one driving element 300. In this embodiment, the first individual flow path can be considered to include the coupling flow path 321, the pressure chamber 331, and the communication hole 341. The second to fourth individual flow paths can also be grasped in the same manner. Further, the flow path common to the four driving elements 301 to 304, that is, the flow path common to the pressure chambers 331 to 334 corresponds to the communication flow path 350 coupled to the four individual flow paths described above. Further, the plurality of nozzle-specific flow paths 130 of this embodiment have substantially the same structure.

The liquid ejecting head 100 of the first embodiment has the following various features mainly related to flow path resistance.

Feature D1

As illustrated in FIG. 6, in plan view seen toward the nozzle plate 240, the width of the communication flow path 350 in the first direction Dr1 at the position overlapping the nozzle 200 is defined as the first width $W_{R1}$, and the width of the pressure chamber 331 in the first direction Dr1 is defined as a pressure chamber width $W_{C1}$, $W_{C1} \leq W_{R1}$ is satisfied.

According to this feature D1, since the first width $W_{R1}$ of the communication flow path 350 is wide, it is possible to suppress the decrease in the ejection efficiency.

In addition, the first width $W_{R1}$ of the communication flow path 350 is preferably greater than the pressure chamber width $W_{C1}$, and more preferably 1.5 times or more the pressure chamber width $W_{C1}$. In addition, the first width $W_{R1}$ of the communication flow path 350 is preferably 2 times or less the pressure chamber width $W_{C1}$, and more preferably equal to 2 times the pressure chamber width $W_{C1}$.

In this embodiment, the width $W_{C1}$ of the pressure chamber 331 is constant regardless of the position in the second direction Dr2. However, when the width $W_{C1}$ of the pressure chamber 331 varies in the second direction Dr2, it is preferable to set the "pressure chamber width $W_{C1}$" in the feature D1 to its maximum value. The four pressure chambers 331 to 334 preferably have the same widths $W_{C1}$ to $W_{C4}$ in the first direction Dr1 and the same lengths $L_{C1}$ in the second direction Dr2.

In the present disclosure, the first width $W_{R1}$ of the communication flow path 350 means the distance between two wall surfaces that define the communication flow path 350 and directly face each other in the first direction Dr1. "Two wall surfaces directly facing each other" means that there is no other wall surface or structure therebetween. The same applies to the width and length of other flow paths such as the pressure chamber 331.

Feature D2

As illustrated in FIG. 3, when the height of the communication flow path 350 in the third direction Dr3 at the position overlapping the nozzle 200 in plan view is defined as a first height $H_{R1}$, the first width $W_{R1}$ of the communication flow path 350 illustrated in FIG. 6 is equal to or greater than the first height $H_{R1}$.

Here, the "first height $H_{R1}$ of the communication flow path 350 at the position overlapping the nozzle 200" means the height of the communication flow path 350 when it is assumed that the nozzle 200 has no concave portion. In other words, the first height $H_{R1}$ of the communication flow path 350 is the distance between the upper surface of the nozzle plate 240 and the lower surface of the communication plate 140. That is, the first height $H_{R1}$ is the distance in the third direction Dr3 between the surface of the nozzle plate 240 that defines the communication flow path 350 and the surface of the communication plate 140 that faces the nozzle plate 240. According to this feature D2, the rigidity of the communication plate 140 can be ensured while reducing the flow path resistance of the communication flow path 350. Note that the first width $W_{R1}$ is preferably greater than the first height $H_{R1}$.

Feature D3

As illustrated in FIG. 3, when the thickness of the communication plate 140 in the third direction Dr3 at the position overlapping the nozzle 200 in plan view is defined as a first thickness $T_{R1}$, the first thickness $T_{R1}$ is greater than the first height $H_{R1}$ of the communication flow path 350.

According to this feature D3, the rigidity of the communication plate 140 can be ensured while reducing the flow path resistance of the communication flow path 350. The first thickness $T_{R1}$ is preferably 2 times or more the first height $H_{R1}$, more preferably 3 times or more, and still more preferably 4 times or more.

Feature D4

When 2 times a width $W_{S1}$ in the first direction Dr1 of a partition wall Pw1 that partitions the pressure chamber 331 and the pressure chamber 332 is defined as V1 ($=2\times W_{S1}$), and the width in the first direction Dr1 of a partition wall Pw2 that partitions the two communication flow paths 350 adjacent in the first direction Dr1 is defined as $W_{S2}$, $V1 \leq W_{S2} \leq V1 + W_{C1}$ is satisfied.

The width $W_{S1}$ in the first direction Dr1 of the partition wall Pw1 that partitions the pressure chamber 331 and the pressure chamber 332 is illustrated in FIG. 6. A width $W_{S2}$ in the first direction Dr1 of the partition wall Pw2 that partitions the two communication flow paths 350 adjacent in the first direction Dr1 is illustrated in FIGS. 6 and 3. Here, V1 is a "first value" and $V1+W_{C1}$ is a "second value". In addition, the "width $W_{S2}$ in the first direction Dr1 of the partition wall Pw2 that partitions the two communication flow paths 350 adjacent to each other in the first direction Dr1" is a width $W_{S2}$ of the partition wall Pw2 when measured at the position where the nozzle 200 is arranged in the second direction Dr2.

Figure 7:
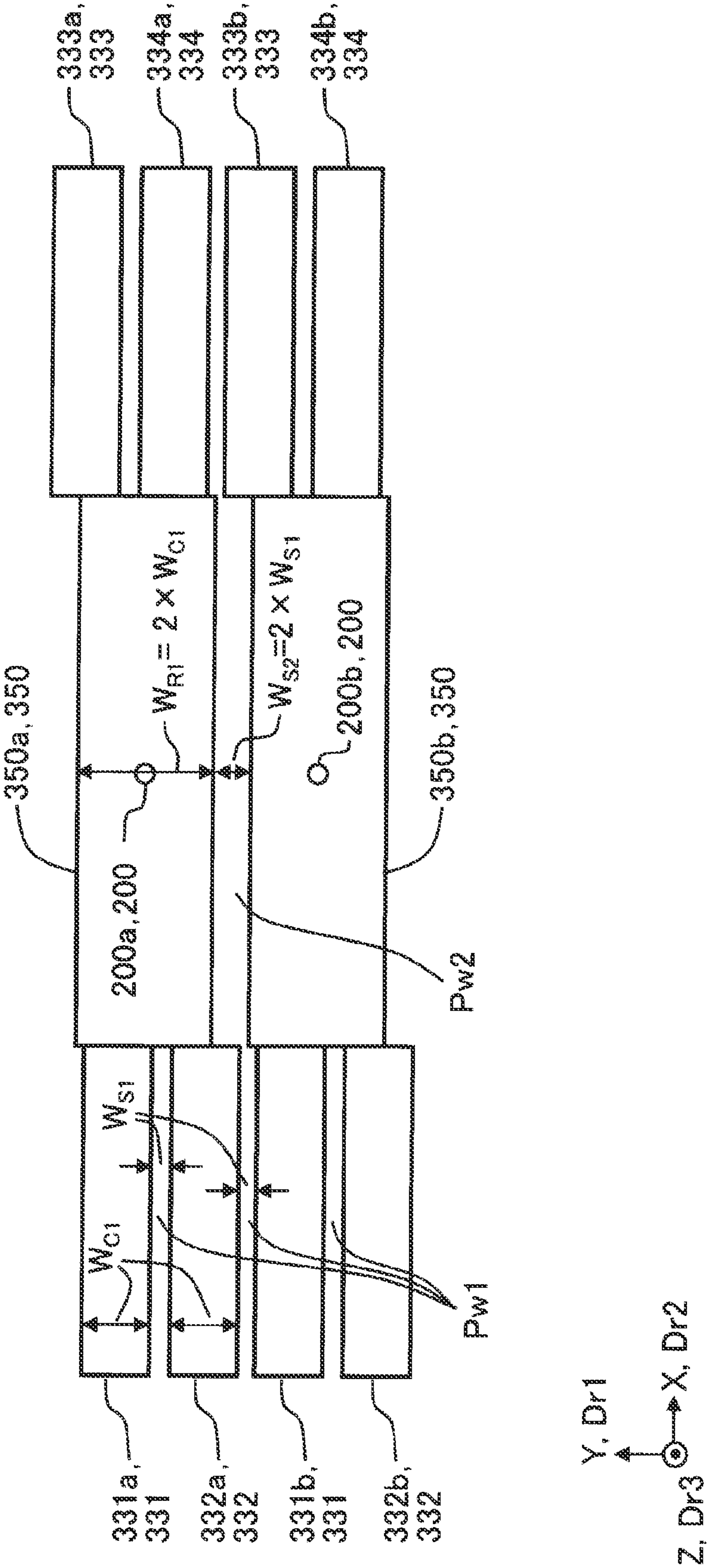
FIG. 7 is an explanatory view illustrating a relationship between a pressure chamber width and a wall thickness.
Figure 8:
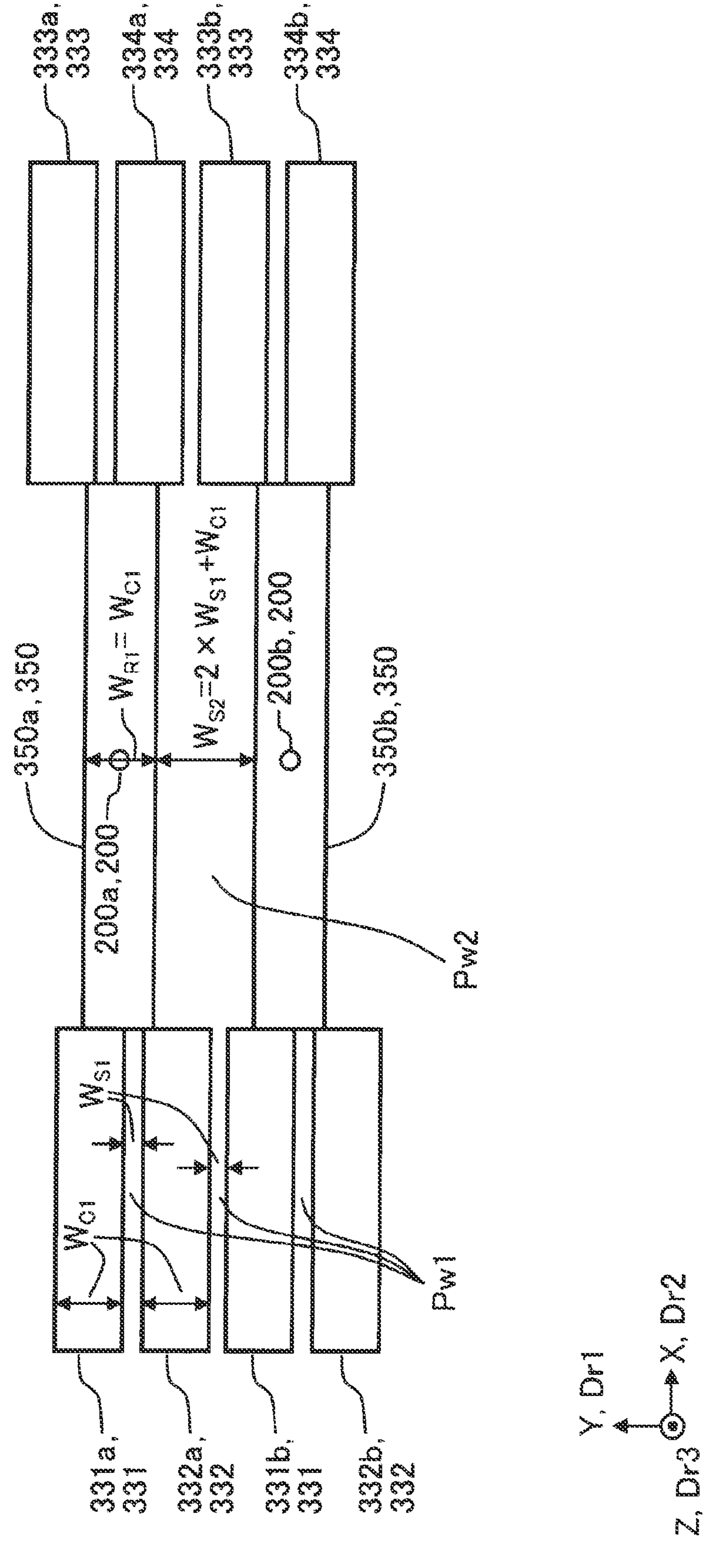
FIG. 8 is an explanatory view illustrating a relationship between a pressure chamber width and a wall thickness.

FIGS. 7 and 8 are explanatory views illustrating the relationship between the pressure chamber width and the wall thickness in relation to the features D4 and D1. In FIGS. 7 and 8, two nozzles 200*a* and 200*b* adjacent to each other in the Y direction, the first communication flow path 350*a* and the pressure chambers 331*a* to 334*a* related to the nozzle 200*a*, a second communication flow path 350*b* and pressure chambers 331*b* to 334*b* related to the nozzle 200*b*, the partition wall Pw1, and the partition wall Pw2 are schematically drawn. Here, the pressure chamber 331*b* communicating with the nozzle 200*b* is an example of the "fifth pressure chamber", the pressure chamber 332*b* communicating with the nozzle 200*b* is an example of the "sixth pressure chamber", the pressure chamber 333*b* communicating with the nozzle 200*b* is an example of the "seventh pressure chamber", and the pressure chamber 334*b* communicating with the nozzle 200*b* is an example of the "eighth pressure chamber". The width $W_{S1}$ of the partition wall Pw1 that partitions the two pressure chambers 330 adjacent to each other in the first direction Dr1 is constant, and the pressure chamber width $W_{C1}$ of each pressure chamber 330 is also constant. In both cases of FIGS. 7 and 8, the flow paths are arranged such that $(2\times W_{C1}+2\times W_{S1})=(W_R1+W_{S2})$ is established.

The example of FIG. 7 corresponds to the case where $W_{R1}=2\times W_{C1}$ in the feature D1, and $W_{S2}=V1=(2\times W_{S1})$ is established in the feature D4. On the other hand, the example of FIG. 8 corresponds to the case where $W_{R1}=W_{C1}$ in the feature D1, and $W_{S2}=(V1+W_{C1})=(2\times W_{S1}+W_{C1})$ is established in the feature D4. In this manner, when the sets of the nozzle 200, the pressure chamber 330, and the communication flow path 350 are densely arranged at regular intervals in the first direction Dr1, it is preferable to have the feature D4.

In addition, as described above, the communication flow path 350 has the second direction Dr2 as its longitudinal direction. That is, an interval $L_G$ in the second direction Dr2 between the two pressure chamber arrays 330_L1 and 330_L2 illustrated in FIGS. 4 and 6 is set to be greater than the first width $W_{R1}$ of the communication flow path 350 in the first direction Dr1.

As described above, according to the first embodiment, the liquid ejecting head 100 has at least a part of the features D1 to D4 described above, the first width $W_{R1}$ of the communication flow path 350 is set to be wide, and the decrease in ejection efficiency can be suppressed. However, some of the features described above can be omitted.

In order to reduce the resistance of the communication flow path 350, a method of increasing the height $H_{R1}$ instead of increasing the width $W_{R1}$ is also conceivable. However, when the height $H_{R1}$ of the communication flow path 350 is increased, the etching depth of the communication plate 140 is increased, which may cause a structure that is not preferable in terms of the decrease in rigidity. On the other hand, in the above-described first embodiment, there is no need to increase the height $H_{R1}$ of the communication flow path 350, and thus there is an advantage that the rigidity of the communication plate 140 does not excessively decrease.

B. Other Embodiments

Figure 9:
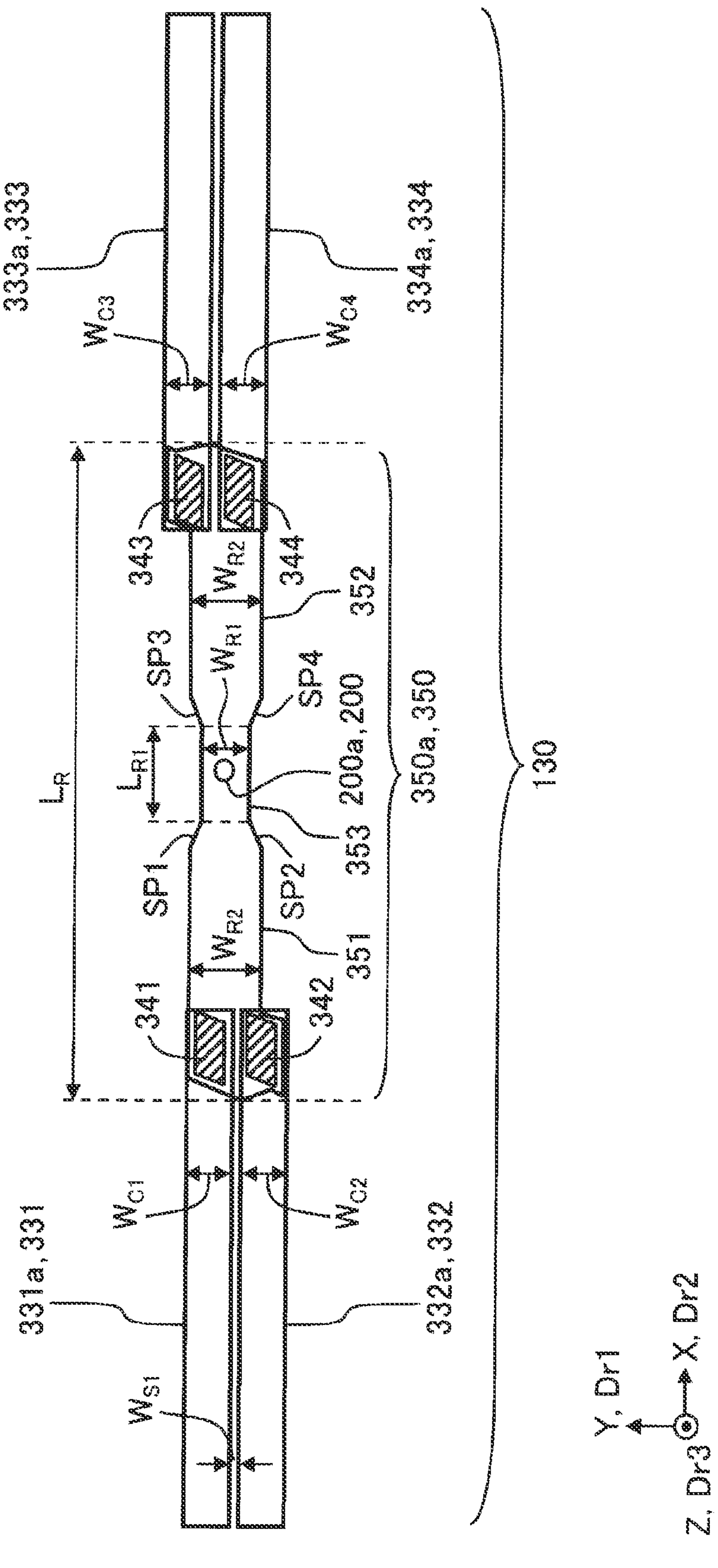
FIG. 9 is a view illustrating a shape of a nozzle-specific flow path in a second embodiment.

FIG. 9 is a view illustrating the shape of the nozzle-specific flow path 130 in the second embodiment. The main difference from the first embodiment illustrated in FIG. 6 is only the shape of the communication flow path 350, and other configurations are substantially the same as those of the first embodiment. In the second embodiment, the communication flow path 350 includes a first part 351, a second part 352, and a third part 353. The first part 351 of the communication flow path 350 is disposed at one end of the communication flow path 350 and coupled to the communication hole 341 and the communication hole 342. The second part 352 of the communication flow path 350 is disposed at the other end of the communication flow path 350 and coupled to the communication hole 343 and the communication hole 344. The third part 353 of the communication flow path 350 is coupled between the first part 351 and the second part 352. In addition, the third part 353 is coupled to the first part 351 and the second part 352 by the inclined surfaces SP1 to SP4. The first width $W_{R1}$ of the third part 353 in the first direction Dr1 is smaller than widths $W_{R2}$ of the first part 351 and the second part 352.

The second embodiment has the following features in addition to the features of the first embodiment described above.

Feature D5

The communication flow path 350 has a part where the width of the communication flow path 350 in the first direction Dr1 is the second width $W_{R2}$ greater than the first width $W_{R1}$ of the communication flow path 350 at the position overlapping the nozzle 200 in plan view, at the position between the pressure chamber 331 and the pressure chamber 332 and the nozzle 200 in plan view. The part having the second width $W_{R2}$ is a part of the first part 351 and extends for a predetermined length in the second direction Dr2.

Similarly, the communication flow path 350 has a part where the width of the communication flow path 350 in the first direction Dr1 is the second width $W_{R2}$ greater than the first width $W_{R1}$ of the communication flow path 350 at the position overlapping the nozzle 200 in plan view, at the position between the pressure chamber 333 and the pressure chamber 334 and the nozzle 200 in plan view. The part having the second width $W_{R2}$ is a part of the second part 352 and extends for a predetermined length in the second direction Dr2. The second width $W_{R2}$ of the first part 351 in the first direction Dr1 and the second width $W_{R2}$ of the second part 352 in the first direction Dr1 are preferably equal to each other.

According to this feature D5, the flow velocity can be increased in the vicinity of the nozzle 200. The advantage of feature D5 is particularly pronounced when pseudoplastic liquids are used, since the viscosity of the liquid can be reduced by increasing the flow velocity.

Under the feature D5, it is preferable to satisfy the following formula (1), and more preferably to satisfy the formula (2).

$$0.1\times W_{C1}\leq(W_{R2}-W_{R1}) \tag{1}$$

$$0.2\times W_{C1}\leq(W_{R2}-W_{R1}) \tag{2}$$

That is, the value obtained by subtracting the first width $W_{R1}$ from the second width $W_{R2}$ $(W_{R2}-W_{R1})$ is preferably 0.1 times or more, and more preferably 0.2 times or more the pressure chamber width $W_{C1}$.

Moreover, it is preferable to satisfy both the following formulas (3a) and (3b).

$$W_{R1}<(W_{C1}\times 1.5) \tag{3a}$$

$$(W_{C1}\times 1.5)<W_{R2}\leq(W_{C1}\times 2) \tag{3b}$$

The first width $W_{R1}$ is preferably 1.5 times or less, more preferably 1.4 times or less, further more preferably 1.3 times or less, even more preferably 1.2 times or less, and most preferably 1.1 times or less the pressure chamber width $W_{C1}$. Moreover, it is particularly preferable that the first width $W_{R1}$ is equal to the pressure chamber width $W_{C1}$. Further, the second width $W_{R2}$ is preferably 1.5 times or more, more preferably 1.6 times or more, further more preferably 1.7 times or more, even more preferably 1.8 times or more, and most preferably 1.9 times or more the pressure chamber width $W_{C1}$. Moreover, it is particularly preferable that the second width $W_{R2}$ is equal to 2 times the pressure chamber width $W_{C1}$.

Preferably, the second embodiment further has the following features.

Feature D6

A first length $L_{R1}$ in the second direction Dr2 of the part having the first width $W_{R1}$ in the communication flow path 350 is 4% or more and 30% or less of a total length $L_R$ in the second direction Dr2 of the communication flow path 350.

According to this feature D6, it is possible to reduce the viscosity of the pseudoplastic liquid in the vicinity of the nozzle 200 while suppressing the decrease in the ejection efficiency by reducing the flow path resistance up to immediately before the nozzle.

Figure 10:
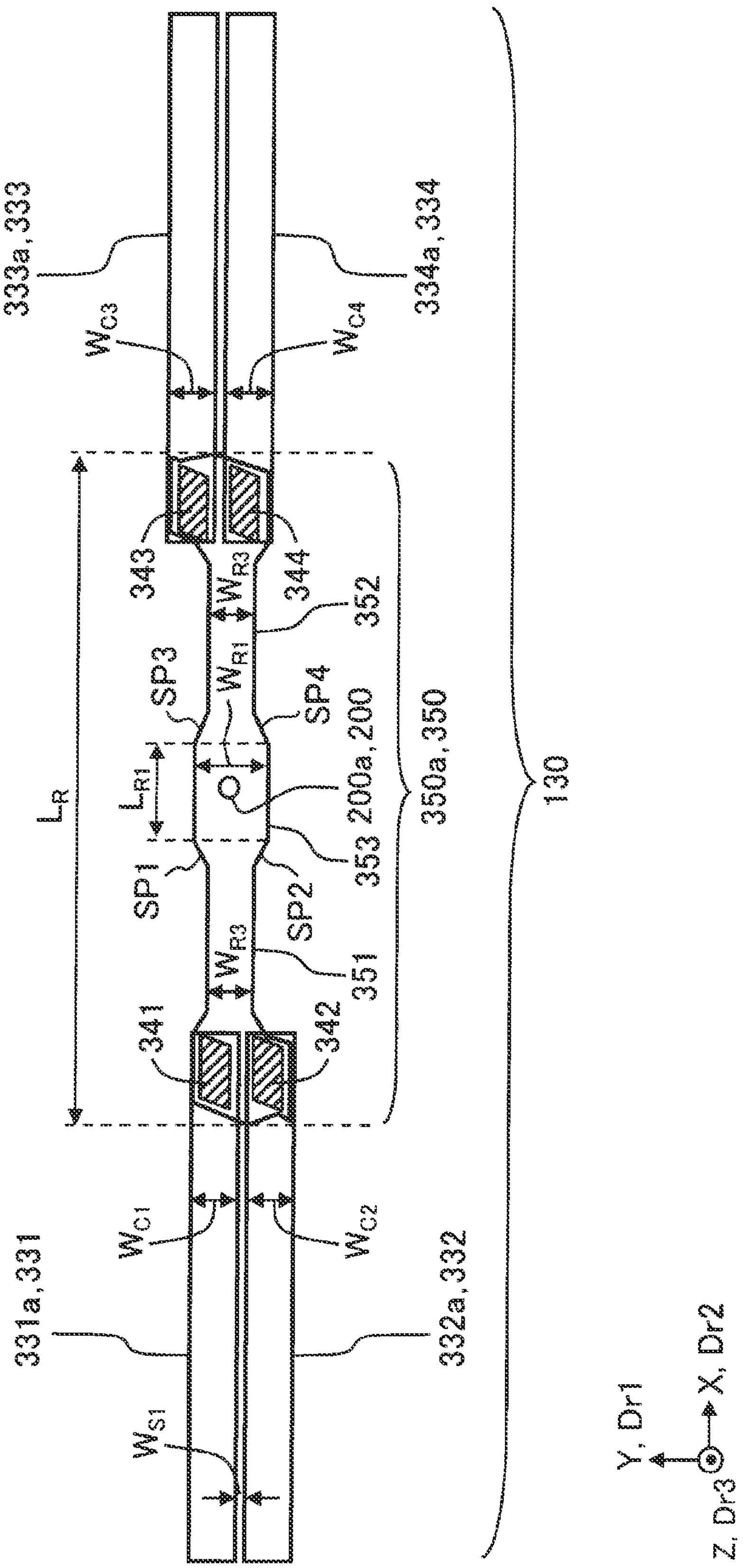
FIG. 10 is a view illustrating a shape of a nozzle-specific flow path in a third embodiment.

FIG. 10 is a view illustrating the shape of the nozzle-specific flow path 130 in the third embodiment. The main difference from the first embodiment illustrated in FIG. 6 is only the shape of the communication flow path 350, and other configurations are substantially the same as those of the first embodiment. In addition, the third embodiment is different from the second embodiment in that the width $W_{R1}$ of the third part 353 in the first direction Dr1 is greater than the width $W_{R3}$ of a part of the first part 351 and the width $W_{R3}$ of a part of the second part 352.

The third embodiment has the following features in addition to the features of the first embodiment described above.

Feature D7

The communication flow path 350 has a part where the width of the communication flow path 350 in the first direction Dr1 is the third width $W_{R3}$ smaller than the first width $W_{R1}$ of the communication flow path 350 at the position overlapping the nozzle 200 in plan view, at the position between the first pressure chamber 331 and the second pressure chamber 332 and the nozzle 200 in plan view. The part having the third width $W_{R3}$ is a part of the first part 351 and extends for a predetermined length in the second direction Dr2.

Similarly, the communication flow path 350 has a part where the width of the communication flow path 350 in the first direction Dr1 is the third width $W_{R3}$ smaller than the first width $W_{R1}$ of the communication flow path 350 at the position overlapping the nozzle 200 in plan view, at the position between the pressure chamber 333 and the pressure chamber 334 and the nozzle 200 in plan view. The part having the third width $W_{R3}$ is a part of the second part 352 and extends for a predetermined length in the second direction Dr2. The third width $W_{R3}$ of the first part 351 in the first direction Dr1 and the third width $W_{R3}$ of the second part 352 in the first direction Dr1 are preferably equal to each other.

In general, it is known that, as the flow velocity of the ink increases, variation in density of particles contained in ink is more likely to occur. Therefore, when the flow velocity of the ink immediately above the nozzle 200 is high, the density of particles contained in the ink immediately above the nozzle decreases. According to the feature D7, the flow path width is widened immediately above the nozzle 200, and the flow velocity immediately above the nozzle 200 is reduced. Therefore, there is an effect that the density of particles contained in ink in the vicinity of the nozzle 200 is easily made uniform.

Under the feature D7, it is preferable to satisfy the following formula (4), and more preferably to satisfy the formula (5).

$$0.1\times W_{C1}\leq(W_{R1}-W_{R3}) \quad (4)$$

$$0.2\times W_{C1}\leq(W_{R1}-W_{R3}) \quad (5)$$

That is, the value obtained by subtracting the first width $W_{R1}$ from the third width $W_{R3}$ ($W_{R3}-W_{R1}$) is preferably 0.1 times or more, and more preferably 0.2 times or more the pressure chamber width $W_{C1}$.

Moreover, it is preferable to satisfy both the following formulas (6a) and (6b).

$$(W_{C1}\times 1.5)<W_{R1} \quad (6a)$$

$$W_{C1}\leq W_{R3}<(W_{C1}\times 1.5) \quad (6b)$$

The first width $W_{R1}$ is preferably 1.5 times or more, more preferably 1.6 times or more, further more preferably 1.7 times or more, even more preferably 1.8 times or more, and most preferably 1.9 times or more the pressure chamber width $W_{C1}$. Moreover, it is particularly preferable that the first width $W_{R1}$ is equal to 2 times the pressure chamber width $W_{C1}$. Further, the third width $W_{R3}$ is preferably 1.5 times or less, more preferably 1.4 times or less, further more preferably 1.3 times or less, even more preferably 1.2 times or less, and most preferably 1.1 times or less the pressure chamber width $W_{C1}$. Moreover, it is particularly preferable that the third width $W_{R3}$ is equal to the pressure chamber width $W_{C1}$.

Preferably, the third embodiment further has the following features.

Feature D8

A first length $L_{R1}$ in the second direction Dr2 of the part having the first width $W_{R1}$ in the communication flow path 350 is 4% or more and 30% or less of a total length $L_R$ in the second direction Dr2 of the communication flow path 350.

According to this feature D8, it is possible to make the variation in the density of the particles contained in the ink more uniform.

Considering the first to third embodiments described above, the communication flow path 350 preferably has the following features.

Feature D9

In plan view, the average value of widths in the first direction Dr1 of the communication flow path 350 from the pressure chambers 331, 332 to the pressure chambers 333, 334 is equal to or greater than the pressure chamber width $W_{C1}$. Note that the "communication flow path 350 from the pressure chambers 331 and 332 to the pressure chambers 333 and 334 in plan view" indicates a part between the pressure chambers 331 and 332 and the pressure chambers 333 and 334 in the communication flow path 350 in plan view, and does not include parts overlapping the pressure chambers 331 and 332 and the pressure chambers 333 and 334 in plan view in the communication flow path 350.

According to this feature D9, the flow path resistance of the communication flow path 350 can be sufficiently reduced.

Figure 11:
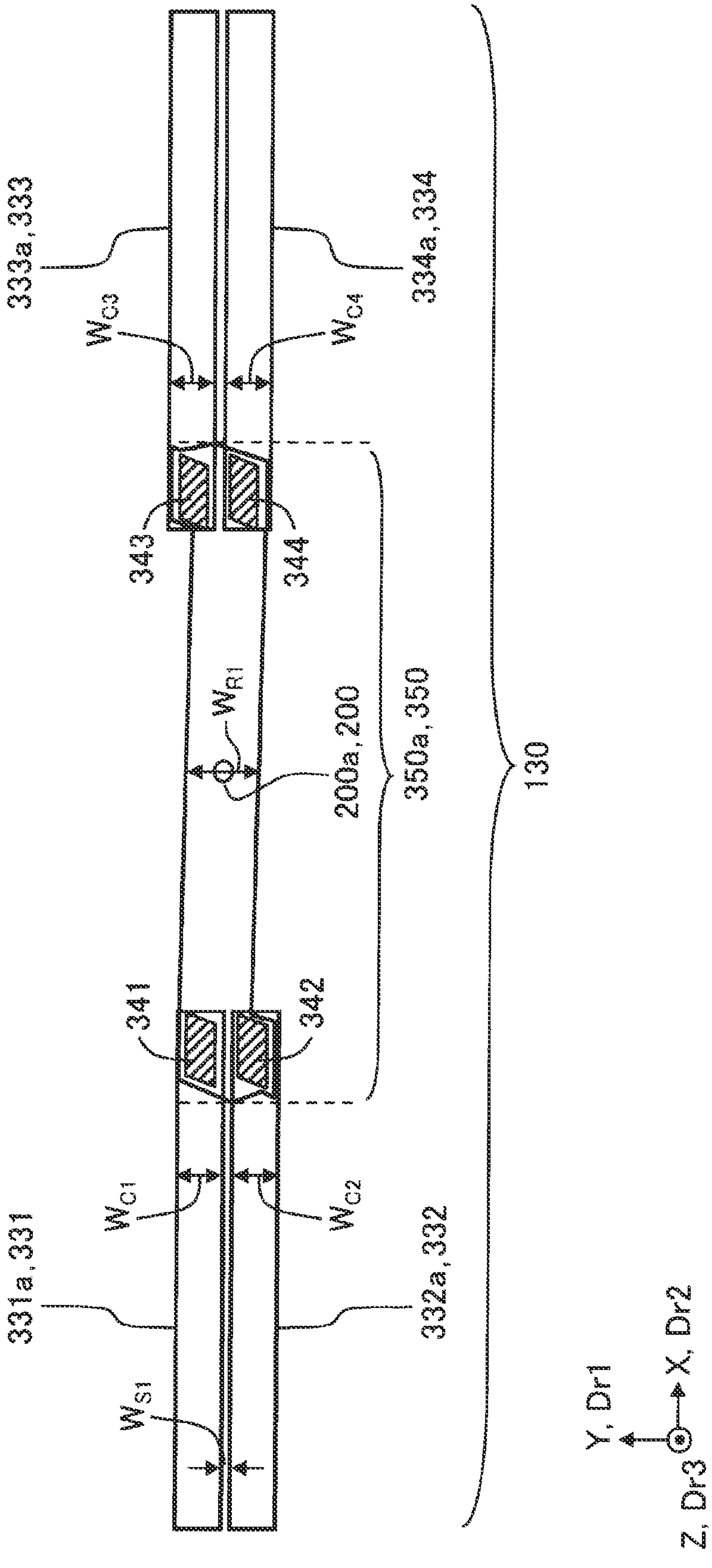
FIG. 11 is a view illustrating a shape of a nozzle-specific flow path in a fourth embodiment.
Figure 12:
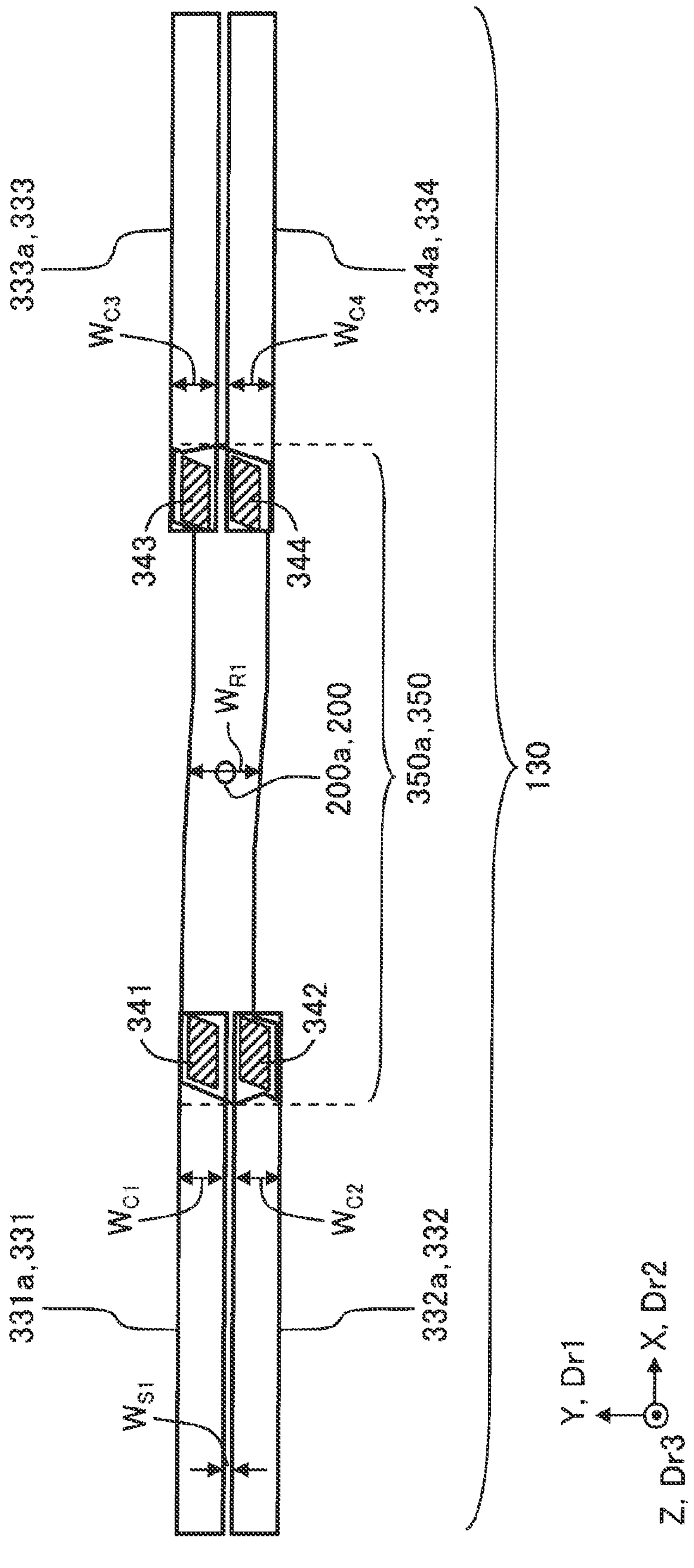
FIG. 12 is a view illustrating a shape of a nozzle-specific flow path in a fifth embodiment.
Figure 13:
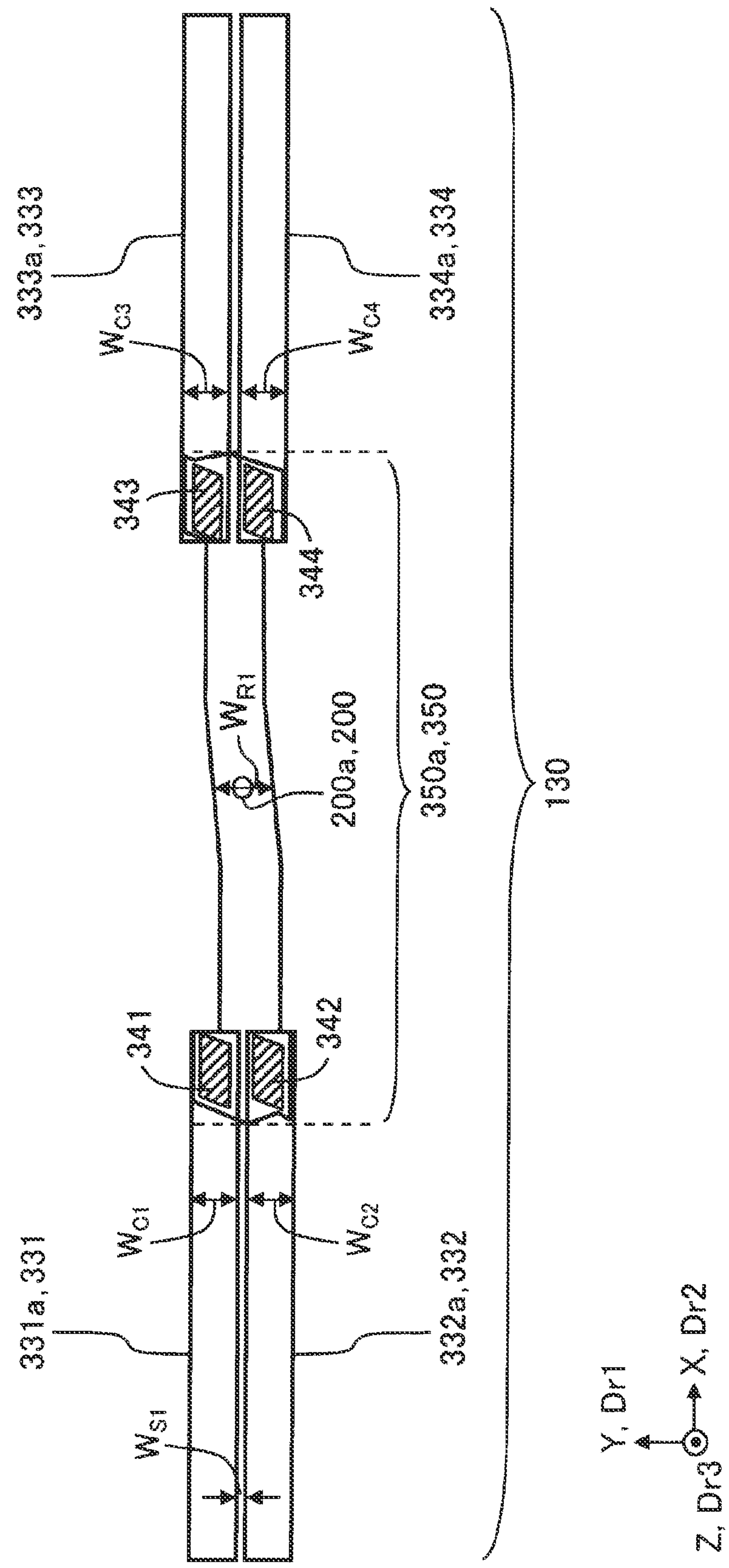
FIG. 13 is a view illustrating a shape of a nozzle-specific flow path in a sixth embodiment.

FIGS. 11 to 13 are views illustrating the shape of the nozzle-specific flow path 130 in the fourth to sixth embodiments. In these fourth to sixth embodiments, the main difference from the first embodiment illustrated in FIG. 6 is only the shape of the communication flow path 350, and other configurations are substantially the same as those of the first embodiment. In the fourth embodiment illustrated in FIG. 11, the entire communication flow path 350 is linear as in the first embodiment, but extends in a direction inclined from the second direction Dr2. In the fifth embodiment illustrated in FIG. 12 and the sixth embodiment illustrated in FIG. 13, the communication flow path 350 is bent in the middle. However, even in the fourth to sixth embodiments, the point that the entire communication flow path 350 extends in the second direction Dr2 is the same as that of the first embodiment. It is preferable that the fourth to sixth embodiments also have the features D1 to D4 described in the first embodiment. In addition, the features D5 to D9 described above may be applied to the fourth to sixth embodiments.

Figure 14:
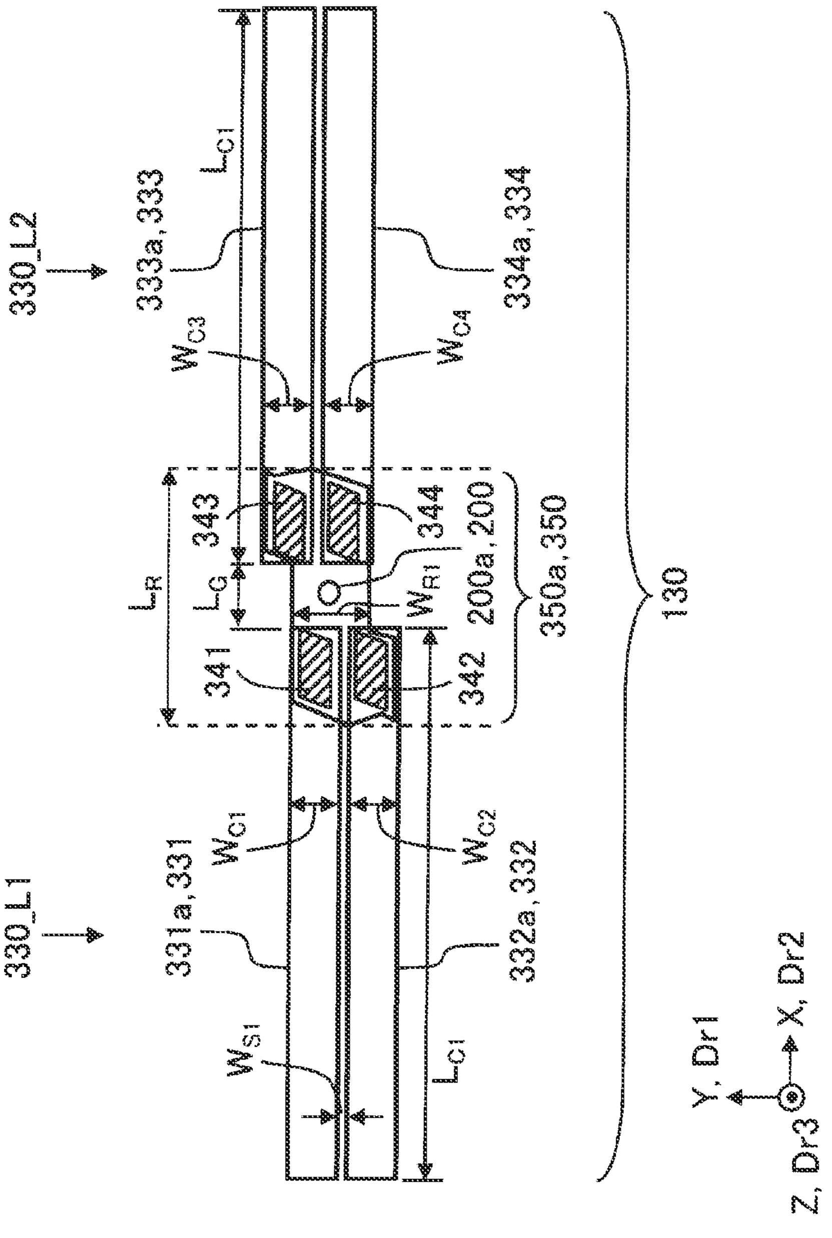
FIG. 14 is a view illustrating a shape of a nozzle-specific flow path in a seventh embodiment.

FIG. 14 is a view illustrating the shape of the nozzle-specific flow path 130 in the seventh embodiment. The main difference between the seventh embodiment and the first embodiment illustrated in FIG. 6 is only the length $L_R$ of the communication flow path 350 in the second direction Dr2, and other configurations are substantially the same as those of the first embodiment. That is, in the seventh embodiment, the length $L_R$ of the communication flow path 350 is shortened from that in the first embodiment.

FIG. 14 also illustrates the length $L_G$ in the second direction Dr2 of the part between the pressure chamber array 330_L1 and the pressure chamber array 330_L2 in the communication flow path 350. This length $L_G$ is preferably equal to or less than the first width $W_{R1}$ of the communication flow path 350. In addition, the length $L_G$ is preferably equal to or less than the length $L_{C1}$ of the pressure chamber 330 in the second direction Dr2. Furthermore, the total length $L_R$ in the second direction Dr2 of the communication flow path 350 is preferably equal to or less than the length $L_{C1}$ of the pressure chamber 330 in the second direction Dr2. The first width $W_{R1}$ of the communication flow path 350 may be smaller than the width $W_{C1}$ of the pressure chamber 330 in the first direction Dr1. That is, the seventh embodiment may not have the feature D1 described in the first embodiment. However, it is also possible to apply one or more of the features D1 to D9 described above to the seventh embodiment. In the seventh embodiment, since the length $L_R$ of the communication flow path 350 is short, the flow path resistance can be further reduced.

Figure 15:
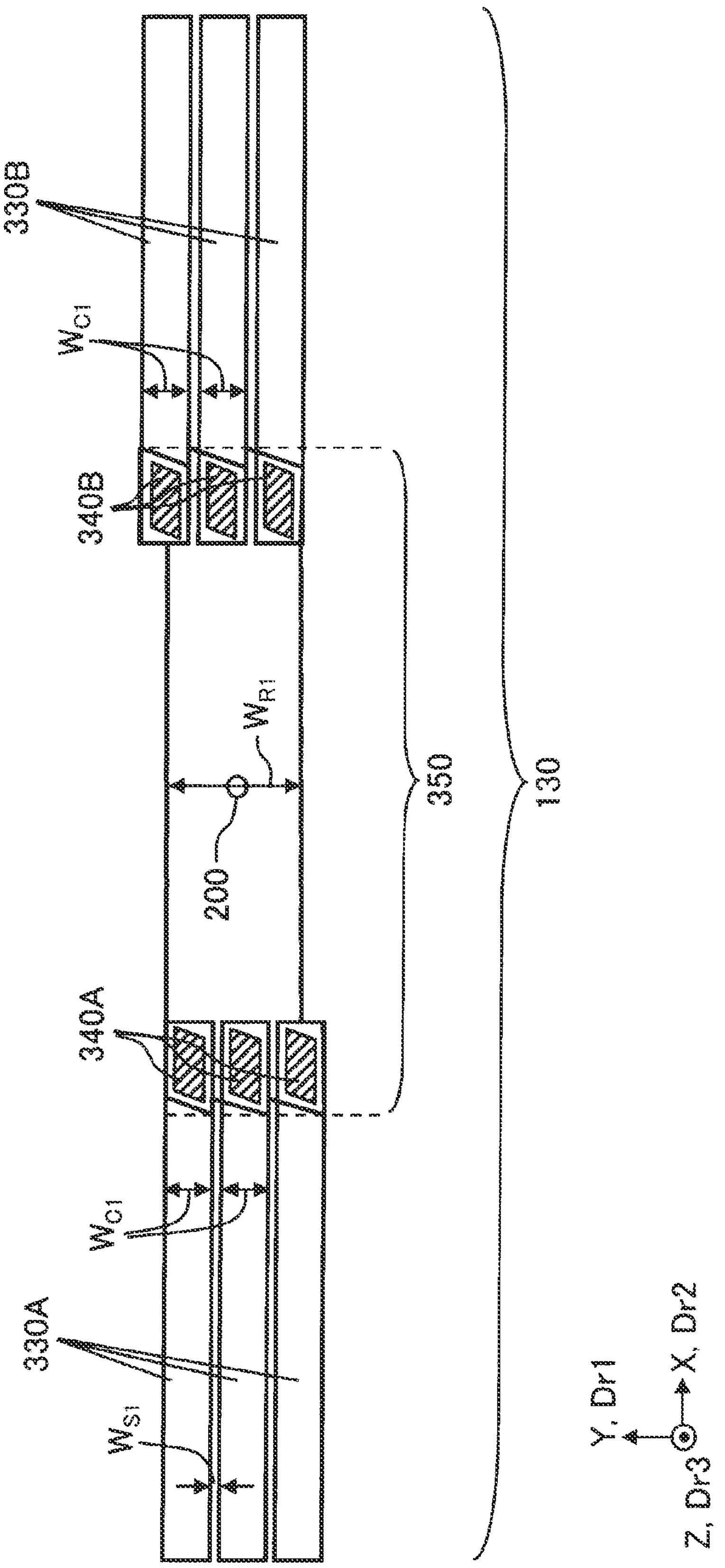
FIG. 15 is a view illustrating a shape of a nozzle-specific flow path in an eighth embodiment.

FIG. 15 is a view illustrating the nozzle-specific flow path 130 in the eighth embodiment. The eighth embodiment has N pressure chambers 330A and N pressure chambers 330B arranged side by side in the first direction Dr1, where N is an integer of 3 or more. The N pressure chambers 330B are shifted from the N pressure chambers 330A in the second direction Dr2. Although N is 3 in the example of FIG. 15, N may be 4 or more. The N communication holes 340A couple the communication flow path 350 and the N pressure chambers 330A, respectively, and the N communication holes 340B couple the communication flow path 350 and the N pressure chambers 330B, respectively. Here, the pressure chamber 330A is an example of the "pressure chamber A", and the pressure chamber 330B is an example of the "pressure chamber B".

The eighth embodiment further has the following features.

Feature D10

In plan view seen toward the nozzle plate 240, when the width of the communication flow path 350 in the first direction Dr1 at the position overlapping the nozzle 200 is defined as the first width $W_{R1}$, and the width of the pressure chamber 330A in the first direction Dr1 is defined as a pressure chamber width $W_{C1}$, $W_{C1} \leq W_{R1}$ is satisfied.

This feature D10 corresponds to the feature D1 related to the first embodiment described above.

Preferably, the eighth embodiment further has the following features.

Feature D11

$(N-1) \times W_{C1} \leq W_{R1} \leq N \times W_{C1}$ is satisfied.

In other words, the first width $W_{R1}$ is preferably (N−1) times or more and N times or less the pressure chamber width $W_{C1}$.

In the eighth embodiment, similarly to the above-described first embodiment, since the width $W_{R1}$ of the communication flow path 350 is large, it is possible to suppress the decrease in ejection efficiency. Some or all of the features D2 to D9 described above may be employed in the eighth embodiment.

Modification Example 1

In each of the above-described aspects, the serial type liquid ejecting apparatus 400 that reciprocates the carriage 434 holding the liquid ejecting head 100 is exemplified. However, the present disclosure can also be applied to a line type liquid ejecting apparatus in which the plurality of nozzles 200 are distributed over the entire width of the medium PM. That is, the carriage that holds the liquid ejecting head 100 is not limited to a serial type carriage, and may be a structure that supports the liquid ejecting head 100 in a line type. In this case, for example, the plurality of liquid ejecting heads 100 are arranged side by side in the width direction of the medium PM, and the plurality of liquid ejecting heads 100 are collectively held by one carriage.

Modification Example 2

In each of the above-described aspects, the liquid ejecting apparatus 400 including the circulation mechanism 60 is exemplified. However, the liquid ejecting apparatus 400 may not include the circulation mechanism 60. That is, both the opening portions 161 and 162 of the housing section 160 are inlets for introducing the liquid from the liquid storage section 420, and both the first common liquid chamber 110 and the second common liquid chamber 120 may be used as flow paths for supplying the liquid supplied from the liquid storage section 420 to the nozzle 200.

Modification Example 3

In each of the above-described aspects, one coupling flow path 320 is coupled to each of the pressure chambers 331 to 334. However, the common coupling flow path 320 may be provided for the pressure chambers 331 and 332 coupled to the same first common liquid chamber 110. In other words, one coupling flow path 320 may be provided corresponding to the plurality of pressure chambers 330. The same applies to pressure chambers 333 and 334 coupled to the same second common liquid chamber 120. When considering four individual flow paths corresponding to the individual pressure chambers 331 to 334 in Modification Example 3, for example, the first individual flow path does not include the coupling flow path 320. The second to fourth individual flow paths can also be grasped in the same manner.

Modification Example 4

In each of the above-described aspects, the coupling flow path 320 is a flow path extending in the Z direction. However, the coupling flow path 320 may be a flow path extending in a direction intersecting the Z direction, and may be a flow path including both a part extending in the Z direction and a part extending in a direction intersecting the Z direction.

Modification Example 5

The liquid ejecting apparatus exemplified in the embodiments can be adopted in various devices such as a facsimile machine and a copier, in addition to a device dedicated to printing. However, the application of the liquid ejecting apparatus is not limited to printing. For example, a liquid ejecting apparatus that ejects a solution of a coloring material is used as a manufacturing device for forming a color filter of a display device such as a liquid crystal display panel. Further, the liquid ejecting apparatus that ejects a solution of a conductive material is used as a manufacturing device for forming wiring or electrodes on the wiring substrate. Further, a liquid ejecting apparatus that ejects a solution of an organic substance related to a living body is used, for example, as a manufacturing device for manufacturing a biochip.

Other Aspects

The present disclosure is not limited to the above-described embodiments and can be implemented with various aspects without departing from the spirit thereof. For example, the present disclosure can also be implemented in the following aspects. For example, the technical features in the embodiments corresponding to the technical features in each aspect described below are to solve some or all of the above-described problems, or in order to achieve some or all of the above-described effects, replacement or combination can be performed as appropriate. Unless the technical features are described as essential in the present specification, deletion is possible as appropriate.

1. According to a first aspect of the present disclosure, there is provided a liquid ejecting head including: a nozzle plate on which a first nozzle for ejecting a liquid is formed; first and second pressure chambers arranged side by side in a first direction; third and fourth pressure chambers arranged side by side in the first direction; a first communication flow path extending along the nozzle plate, coupled to the first nozzle, and communicating with the first to fourth pressure chambers; a first common liquid chamber communicating with the first and second pressure chambers; and a second common liquid chamber communicating with the third and fourth pressure chambers. The first and second pressure chambers and the third and fourth pressure chambers are shifted in a second direction orthogonal to the first direction. When a width of the first communication flow path in the first direction at a position overlapping the first nozzle in plan view seen toward the nozzle plate is defined as a first width, and a width of the first pressure chamber in the first direction is defined as a pressure chamber width, the first width is equal to or greater than the pressure chamber width.

According to this liquid ejecting head, since the width of the communication flow path is wide, it is possible to suppress the decrease in ejection efficiency.

2. In the liquid ejecting head, the first width may be greater than the pressure chamber width.

3. The first width may be 1.5 times or more the pressure chamber width.

4. The first width may be 2 times or less the pressure chamber width.

5. When a thickness direction of the nozzle plate is defined as a third direction, and a height of the first communication flow path in the third direction at the position overlapping the first nozzle in the plan view is defined as a first height, the first width may be equal to or greater than the first height.

According to this liquid ejecting head, it is possible to ensure the rigidity of the member forming the communication flow path while reducing the flow path resistance of the communication flow path.

6. A communication plate on which the first communication flow path is formed may further be provided on a surface facing the nozzle plate, and when a thickness of the communication plate in the third direction at the position overlapping the first nozzle in the plan view is defined as a first thickness, the first thickness may be greater than the first height.

According to this liquid ejecting head, it is possible to ensure the rigidity of the communication plate while reducing the flow path resistance of the communication flow path.

7. The first communication flow path may have a part where a width in the first direction is a second width greater than the first width, at a position between the first and second pressure chambers and the first nozzle in the plan view.

According to this liquid ejecting head, the flow velocity can be increased in the vicinity of the nozzles.

8. A value obtained by subtracting the first width from the second width may be 0.1 times or more the pressure chamber width.

9. The liquid may have pseudoplasticity.

According to this liquid ejecting head, since the flow velocity is increased in the vicinity of the nozzles to easily lower the viscosity, it is possible to reduce ejection failures of the pseudoplastic ink.

10. A first length in the second direction of a part having the first width may be 4% or more and 30% or less of a total length in the second direction of the first communication flow path.

According to this liquid ejecting head, it is possible to reduce the viscosity of the pseudoplastic liquid in the vicinity of the nozzle while suppressing the decrease in the ejection efficiency by reducing the flow path resistance up to immediately before the nozzle.

11. The first communication flow path may have a part where a width in the first direction is a third width smaller than the first width, at a position between the first and second pressure chambers and the first nozzle in the plan view.

According to this liquid ejecting head, it is known, as the flow velocity of the liquid increases, variation in density of particles contained in liquid is more likely to occur. Therefore, when the flow velocity of the liquid immediately above the nozzle is high, the density of particles contained in the liquid immediately above the nozzle decreases. The flow path width is widened immediately above the nozzle, and the flow velocity immediately above the nozzle is reduced. Therefore, the density of particles contained in the liquid in the vicinity of the nozzle is easily made uniform.

12. A value obtained by subtracting the third width from the first width may be 0.1 times or more the pressure chamber width.

13. A first length in the second direction of a part having the first width may be 4% or more and 30% or less of a total length in the second direction of the first communication flow path.

According to this liquid ejecting head, the particles in the liquid can be made uniform.

14. The first common liquid chamber may be a flow path for supplying a liquid to the first and second pressure chambers, and the second common liquid chamber may be a flow path for collecting a liquid from the third and fourth pressure chambers.

15. An average value of widths in the first direction of the first communication flow path from the first and second pressure chambers to the third and fourth pressure chambers in the plan view may be equal to or greater than the pressure chamber width.

16. The first communication flow path may have the second direction as a longitudinal direction.

17. The first communication flow path may be a flow path common to the first to fourth pressure chambers.

18. A second nozzle for ejecting a liquid may be formed on the nozzle plate, and fifth and sixth pressure chambers arranged side by side in the first direction; seventh and eighth pressure chambers shifted from the fifth and sixth pressure chambers in the second direction and arranged side by side in the first direction; and a second communication flow path extending along the nozzle plate, coupled to the second nozzle, and communicating with the fifth to eighth pressure chambers may further be provided. The first common liquid chamber communicates with the fifth and sixth pressure chambers, and the second common liquid chamber communicates with the seventh and eighth pressure chambers. When 2 times a width in the first direction of a partition wall that partitions the first pressure chamber and the second pressure chamber is defined as a first value, a width in the first direction of a partition wall that partitions the first communication flow path and the second communication flow path may be equal to or greater than the first value and equal to or less than a second value obtained by adding the pressure chamber width to the first value.

19. According to a second aspect of the present disclosure, there is provided a liquid ejecting head including: a nozzle plate on which nozzles for ejecting a liquid are formed; N pressure chambers A arranged side by side in a first direction when N is an integer of 3 or more; N pressure chambers B shifted from the N pressure chambers A in a second direction orthogonal to the first direction, and arranged side by side in the first direction; a communication flow path extending along the nozzle plate, coupled to the nozzle, and communicating with the N pressure chambers A and the N pressure chambers B; a first common liquid chamber communicating with the N pressure chambers A; and a second common liquid chamber communicating with the N pressure chambers B. When a width of the communication flow path in the first direction at a position overlapping the nozzle in plan view seen toward the nozzle plate is defined as a first width, and a width of the pressure chamber A in the first direction is defined as a pressure chamber width, the first width is equal to or greater than the pressure chamber width.

20. In the liquid ejecting head, the first width may be (N−1) times or more and N times or less the pressure chamber width.

21. According to a third aspect of the present disclosure, there is provided a liquid ejecting apparatus including: the liquid ejecting head; and a liquid storage section for storing a liquid supplied to the liquid ejecting head.

The present disclosure can also be implemented in various aspects other than the liquid ejecting head and the liquid ejecting apparatus. For example, the present disclosure can be implemented in the aspect of a method for manufacturing a liquid ejecting head and a liquid ejecting apparatus, a method for controlling the liquid ejecting head and the liquid ejecting apparatus, a computer program for implementing the control method, and a non-temporary recording medium that records the computer program.

What is claimed is:

1. A liquid ejecting head comprising:

a nozzle plate on which a first nozzle configured to eject a liquid is formed;

first and second pressure chambers arranged side by side in a first direction;

third and fourth pressure chambers arranged side by side in the first direction;

a first communication flow path extending along the nozzle plate, coupled to the first nozzle, and communicating with the first to fourth pressure chambers;

a first common liquid chamber communicating with the first and second pressure chambers; and a second common liquid chamber communicating with the third and fourth pressure chambers, wherein the first and second pressure chambers and the third and fourth pressure chambers are shifted in a second direction orthogonal to the first direction, and when a width of the first communication flow path in the first direction at a position overlapping the first nozzle in plan view seen toward the nozzle plate is defined as a first width, and a width of the first pressure chamber in the first direction is defined as a pressure chamber width, the first width is equal to or greater than the pressure chamber width.

2. The liquid ejecting head according to claim 1, wherein the first width is greater than the pressure chamber width.

3. The liquid ejecting head according to claim 1, wherein the first width is 1.5 times or more the pressure chamber width.

4. The liquid ejecting head according to claim 1, wherein the first width is 2 times or less the pressure chamber width.

5. The liquid ejecting head according to claim 1, wherein when a thickness direction of the nozzle plate is defined as a third direction, and a height of the first communication flow path in the third direction at the position overlapping the first nozzle in the plan view is defined as a first height, the first width is equal to or greater than the first height.

6. The liquid ejecting head according to claim 5, further comprising:

a communication plate on which the first communication flow path is formed on a surface facing the nozzle plate, wherein when a thickness of the communication plate in the third direction at the position overlapping the first nozzle in the plan view is defined as a first thickness, the first thickness is greater than the first height.

7. The liquid ejecting head according to claim 1, wherein the first communication flow path has a part where a width in the first direction is a second width greater than the first width, at a position between the first and second pressure chambers and the first nozzle in the plan view.

8. The liquid ejecting head according to claim 7, wherein a value obtained by subtracting the first width from the second width is 0.1 times or more the pressure chamber width.

9. The liquid ejecting head according to claim 7, wherein a first length in the second direction of a part having the first width is 4% or more and 30% or less of a total length in the second direction of the first communication flow path.

10. The liquid ejecting head according to claim 1, wherein the first communication flow path has a part where a width in the first direction is a third width smaller than the first width, at a position between the first and second pressure chambers and the first nozzle in the plan view.

11. The liquid ejecting head according to claim 10, wherein a value obtained by subtracting the third width from the first width is 0.1 times or more the pressure chamber width.

12. The liquid ejecting head according to claim 10, wherein a first length in the second direction of a part having the first width is 4% or more and 30% or less of a total length in the second direction of the first communication flow path.

13. The liquid ejecting head according to claim 1, wherein the first common liquid chamber is a flow path for supplying a liquid to the first and second pressure chambers, and the second common liquid chamber is a flow path for collecting a liquid from the third and fourth pressure chambers.

14. The liquid ejecting head according to claim 1, wherein an average value of widths in the first direction of the first communication flow path from the first and second pressure chambers to the third and fourth pressure chambers in the plan view is equal to or greater than the pressure chamber width.

15. The liquid ejecting head according to claim 1, wherein the first communication flow path has the second direction as a longitudinal direction.

16. The liquid ejecting head according to claim 1, wherein the first communication flow path is a flow path common to the first to fourth pressure chambers.

17. The liquid ejecting head according to claim 1, wherein a second nozzle configured to eject a liquid is formed on the nozzle plate, the liquid ejecting head further comprises:

fifth and sixth pressure chambers arranged side by side in the first direction;

seventh and eighth pressure chambers shifted from the fifth and sixth pressure chambers in the second direction and arranged side by side in the first direction; and a second communication flow path extending along the nozzle plate, coupled to the second nozzle, and communicating with the fifth to eighth pressure chambers, the first common liquid chamber communicates with the fifth and sixth pressure chambers, the second common liquid chamber communicates with the seventh and eighth pressure chambers, and when 2 times a width in the first direction of a partition wall that partitions the first pressure chamber and the second pressure chamber is defined as a first value, a width in the first direction of a partition wall that partitions the first communication flow path and the second communication flow path is equal to or greater than the first value and equal to or less than a second value obtained by adding the pressure chamber width to the first value.

18. A liquid ejecting apparatus comprising:

the liquid ejecting head according to claim 1; and a liquid storage section for storing a liquid supplied to the liquid ejecting head.

19. A liquid ejecting head comprising:

a nozzle plate on which nozzles configured to eject a liquid are formed;

N pressure chambers A arranged side by side in a first direction when N is an integer of 3 or more;

N pressure chambers B shifted from the N pressure chambers A in a second direction orthogonal to the first direction, and arranged side by side in the first direction;

a communication flow path extending along the nozzle plate, coupled to the nozzle, and communicating with the N pressure chambers A and the N pressure chambers B;

a first common liquid chamber communicating with the N pressure chambers A; and a second common liquid chamber communicating with the N pressure chambers B, wherein when a width of the communication flow path in the first direction at a position overlapping the nozzle in plan view seen toward the nozzle plate is defined as a first width, and a width of the pressure chamber A in the first direction is defined as a pressure chamber width, the first width is equal to or greater than the pressure chamber width.

20. The liquid ejecting head according to claim 19, wherein the first width is (N−1) times or more and N times or less the pressure chamber width.

* * * * *